(12) United States Patent
Iizuka et al.

(10) Patent No.: US 7,308,194 B2
(45) Date of Patent: Dec. 11, 2007

(54) INFORMATION RECEPTION DEVICE, INFORMATION TRANSMISSION SYSTEM, AND INFORMATION RECEPTION METHOD

(75) Inventors: Nobuo Iizuka, Hamura (JP); Shoichi Nagatomo, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/435,229

(22) Filed: May 16, 2006

(65) Prior Publication Data

US 2006/0239675 A1 Oct. 26, 2006

Related U.S. Application Data

(63) Continuation of application No. PCT/JP2005/010290, filed on May 30, 2005.

(30) Foreign Application Priority Data

May 31, 2004 (JP) ............................. 2004-162521
May 30, 2005 (JP) ............................. 2005-157048

(51) Int. Cl.
*G03B 17/00* (2006.01)
(52) U.S. Cl. ................ 396/56; 348/211.2; 348/333.03
(58) Field of Classification Search ................. 396/56, 396/57; 348/211.2, 333.03
See application file for complete search history.

(56) References Cited

U.S. PATENT DOCUMENTS

| | | | | |
|---|---|---|---|---|
| 4,873,576 A | * | 10/1989 | Hattori et al. ......... | 348/333.02 |
| 5,706,049 A | * | 1/1998 | Moghadam et al. ... | 348/333.03 |
| 6,604,049 B2 | * | 8/2003 | Yokota ........................ | 701/213 |
| 6,750,790 B2 | * | 6/2004 | Ohki ............................ | 341/50 |
| 6,933,956 B2 | * | 8/2005 | Sato et al. ................... | 345/690 |
| 6,999,112 B2 | * | 2/2006 | Seaman et al. ........... | 348/207.1 |
| 2003/0058262 A1 | * | 3/2003 | Sato et al. ................... | 345/690 |
| 2004/0046779 A1 | * | 3/2004 | Asano et al. ............... | 345/716 |
| 2006/0256007 A1 | * | 11/2006 | Rosenberg ............. | 342/357.08 |

FOREIGN PATENT DOCUMENTS

| | | |
|---|---|---|
| JP | 7-307891 A | 11/1995 |
| JP | 10-200810 A | 7/1998 |
| JP | 2001-119611 A | 4/2001 |
| JP | 2001-245253 A | 9/2001 |
| JP | 2003-179556 A | 6/2003 |

* cited by examiner

*Primary Examiner*—W. B. Perkey
(74) *Attorney, Agent, or Firm*—Frishauf, Holtz, Goodman & Chick, P.C.

(57) ABSTRACT

An information reception device comprising an imaging portion; a light reception portion for light reception of optional information subjected to optical modulation; a specification portion for specifying an optical modulation region contained in a capture angle of the imaging portion; a decoding portion for controlling the light reception portion in order to carry out light reception of the optical modulation region specified by the specification portion and decoding the optional information from the optical modulation content contained in the region; and a reproduction portion for reproducing the optional information decoded by the decoding portion. By acquiring a region essential for detection of optical modulation, acceleration of the information decoding process is achieved. Furthermore, position adjustment of the optical modulation region is easily accomplished.

11 Claims, 33 Drawing Sheets

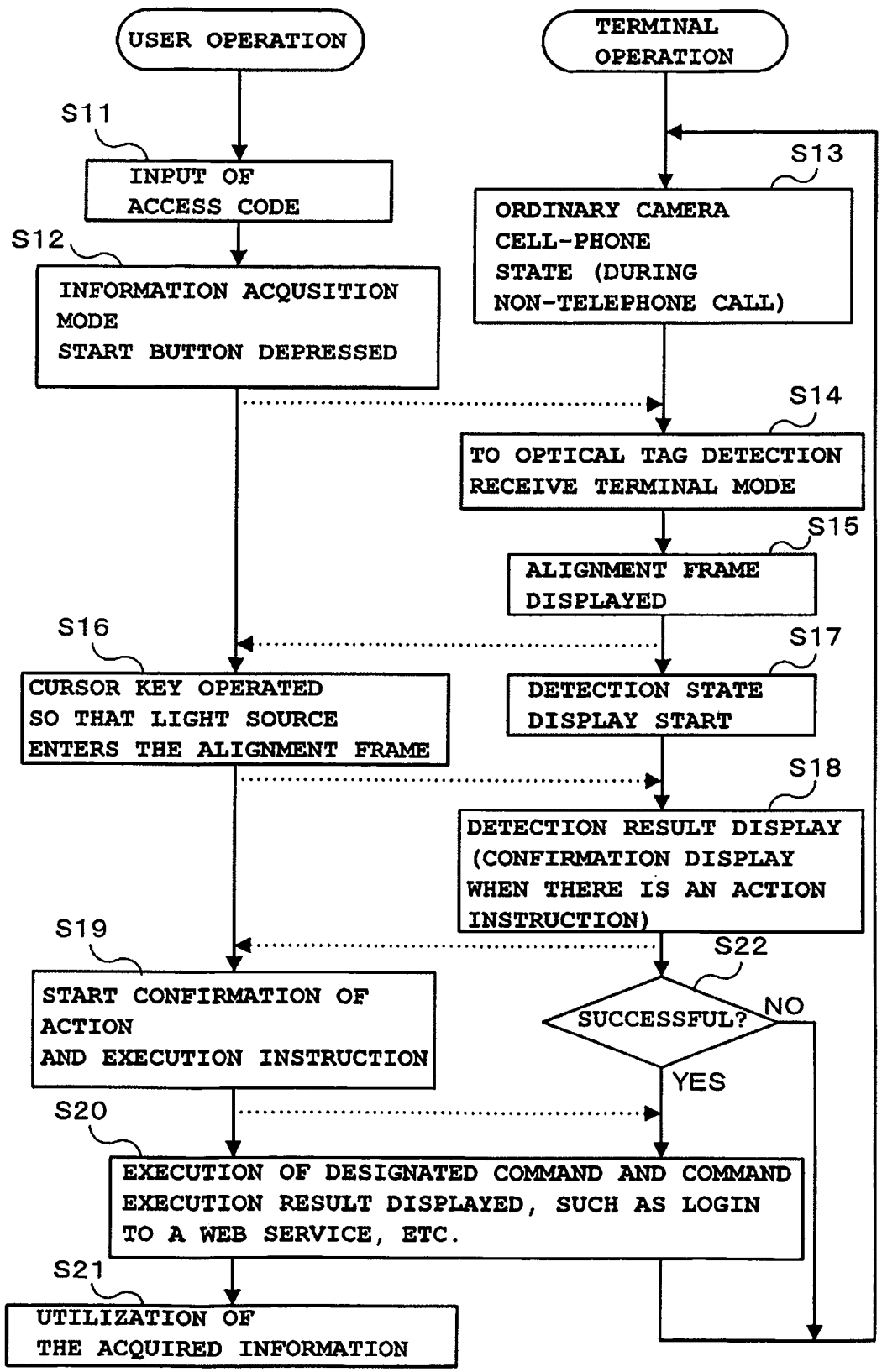

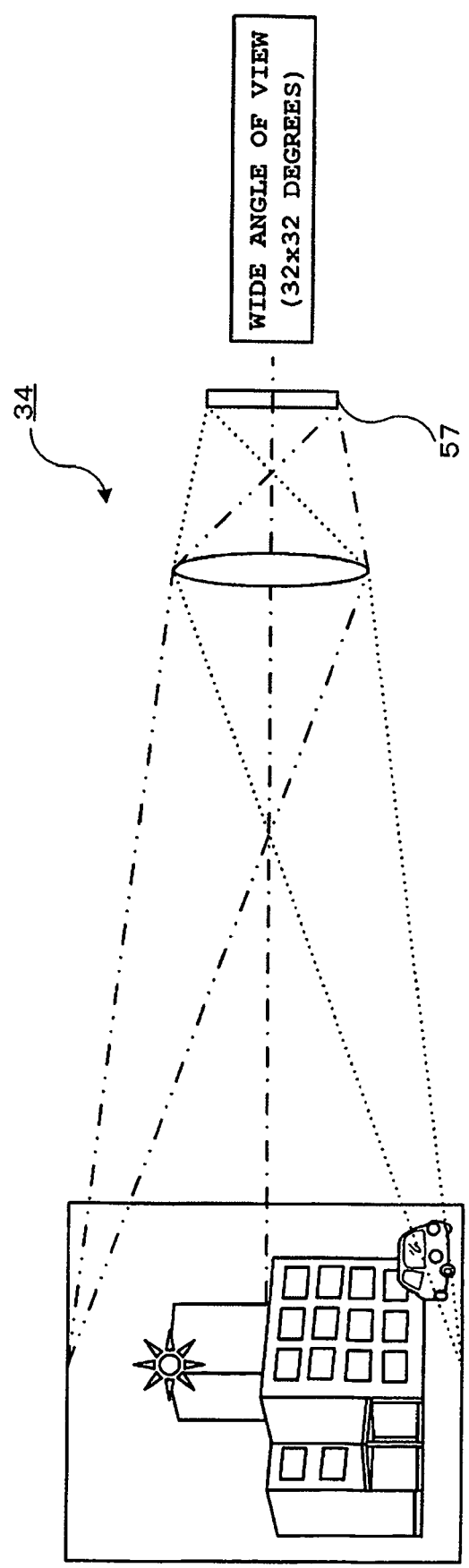

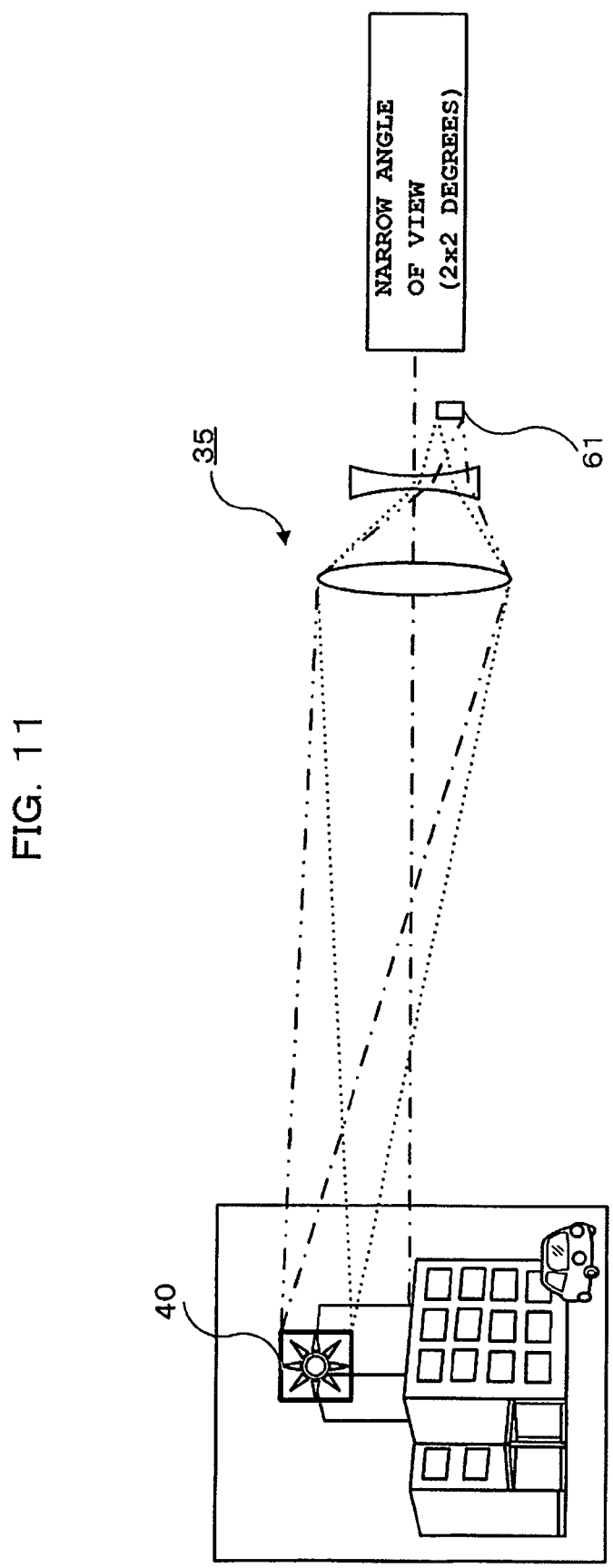

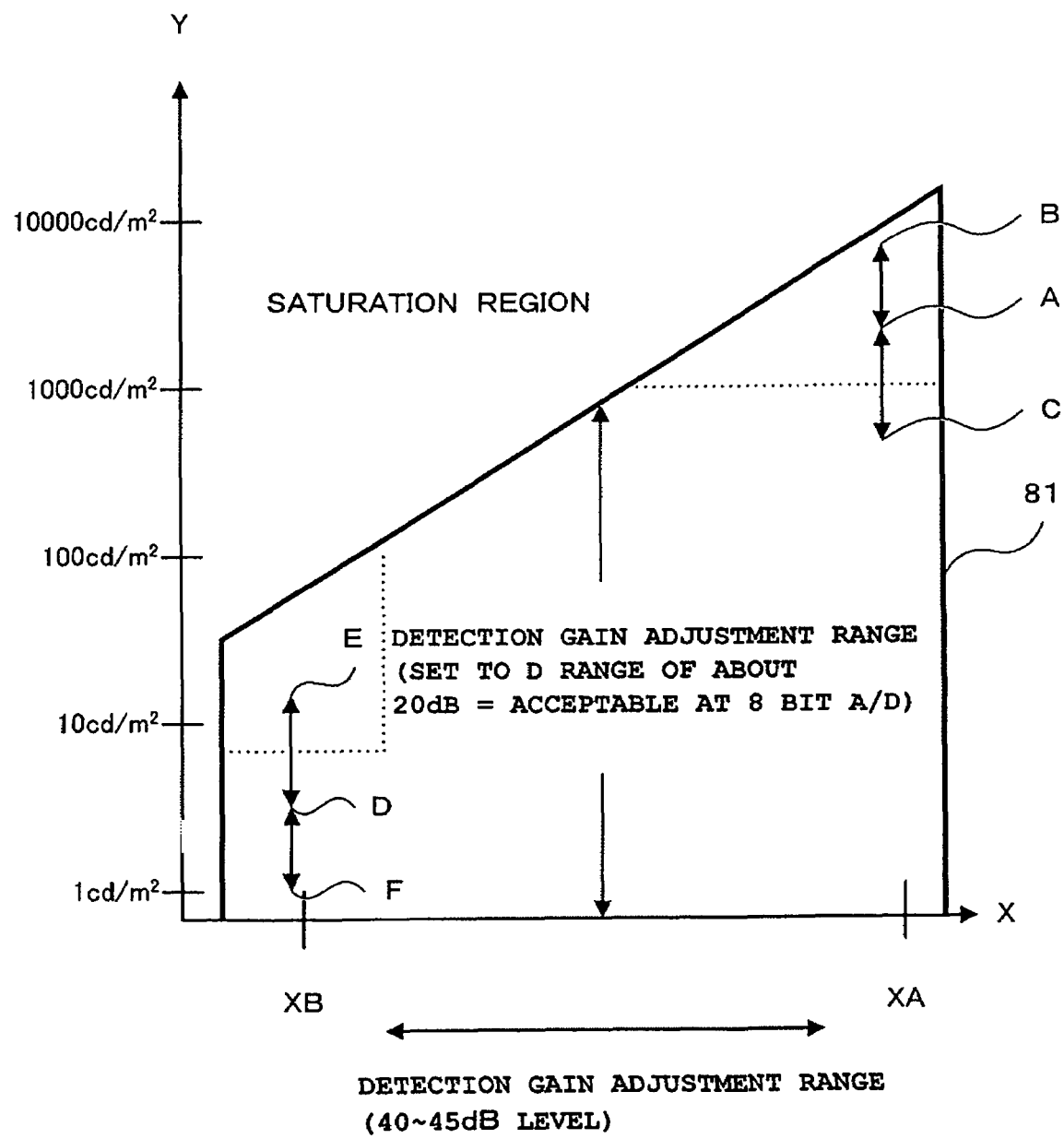

FIG. 17

0: NO AUTOMATIC OPERATION (SCREEN CHARACTER DISPLAY OF PARAMETER 1)

1: ACCESS URL OF PARAMETER 2 WITH PARAMETER 3 AUTHENTICATION INFORMATION AND PAGE DISPLAYED
(PARAMETER 3 = IF 0 BYTES THERE IS NO AUTHENTICATION)

2: ACCESS URL OF PARAMETER 2 WITH PARAMETER 3 AUTHENTICATION INFORMATION AND DATA DOWNLOADED
(PARAMETER 3 = IF 0 BYTES THERE IS NO AUTHENTICATION)

3: TRANSMIT E-MAIL OF THE CONTENT OF PARAMETER 3 TO E-MAIL ADDRESS OF PARAMETER 2

4: OPEN NEW E-MAIL COMPOSITION SCREEN TO E-MAIL ADDRESS OF PARAMETER 2

5: OUTGOING TELEPHONE CALL TO TELEPHONE NUMBER OF PARAMETER 2

6: DATA OF PARAMETER 2 SAVED AS SCHEDULE DATA

WITH ALL COMMANDS, SCREEN DISPLAY OF PARAMETER 1 (USED FOR CONFIRMATION DIALOG)

INFORMATION RECEPTION DEVICE, INFORMATION TRANSMISSION SYSTEM, AND INFORMATION RECEPTION METHOD

This is a Continuation Application of PCT application No. PCT/JP2005/010290 filed on May 30, 2005.

TECHNICAL FIELD

The present invention relates to an information reception device, information transmission system and information reception method which can be ideally used for various purposes, for example, a landmark display for a building, etc.; an advertisement display; recreational facility information or congestion situation of an amusement park, etc.; description of an item in a store window; explanation of an exhibit in a museum or public show, etc.

BACKGROUND ART

In the past, a landmark display for a building, etc.; an advertisement display; recreational facility information or congestion situation of an amusement park, etc.; description of an item in a store window; explanation of an exhibit in a museum or public show, etc. has been performed using "visual information," such as characters, graphic symbols, etc., written on "information presentation signs," such as paper, banners, billboards, plates, etc.

However, when someone wants to look for a specific information notice in an environment with a lot of information presentation signs, a problem occurs in that the information notice is not conspicuous with the surrounding information presentation signs. For example, when product A and product B are adjacently exhibited at a store, the item description of product A may be mistaken for the item description of product B.

Consequently, with the use of information transmission by optical space transmission as in the conventional prior art 1 (reference to Japanese Laid-Open Patent Application No. 2001-245253 titled "IMAGING DEVICE"/Page 2, Page 5, FIG. 1 and FIG. 10), the information presentation for a product and the corresponding relationship of its presentation information can be clarified as well as erroneous assumption of information comprehension can be eliminated. Furthermore, an information reception device which also considers information integrity has been devised.

Specifically, this conventional prior art 1 discloses time-oriented image capturing with an electronic still camera and memorization of an optical tag unit mounted near a product arranged in a showcase. The data is recognized as information subjected to optical modulation from the time-oriented optical variation of the optical tag unit which resides in that stored image. Afterwards, the data about that particular product is extracted from this information subjected to optical modulation. The same extracted information is displayed superimposed on the captured image. However, in this conventional prior art 1, there exists a technological problem in that extraction of the optical tag unit information cannot be performed accurately, for example, when there is a light source (for example, disturbance light, such as flicker of a fluorescent light) in the vicinity which is prone to optical variations by the same pattern as the optical variation pattern of a blinking optical tag unit.

In view of such a problem, as in the conventional prior art 2 (reference to Japanese Laid-Open Patent Application No. 2003-179556 titled "INFORMATION TRANSMISSION METHOD, INFORMATION TRANSMISSION SYSTEM, IMAGING APPARATUS AND INFORMATION TRANSMISSION METHOD"/Pages 7~8 and FIGS. 7~10), an information reception device, information transmission system and information transmission method has been devised which always extracts information properly and avoids adverse effect produced by disturbance light.

Specifically, this conventional prior art 2 uses a light reception unit having an image sensor, such as a CCD (Charge-Coupled Device), etc. An optical variation from a light-emitting unit (equivalent to the optical tag unit in the conventional prior art 1) is detected which exists in the capture angle (also referred to as the field of view) of the image sensor. While binarization of a bit pattern sequence is being carried out by converting the variation level of that optical variation into modulation information, the operation determines whether or not any bit pattern sequence coincides with previously prepared binarized bit pattern sequences which did not correlate reciprocally. Subsequently, by generating a two-value logic signal (1/0) based on that determination result, the transmitted information from the light emitting unit is reproduced. In this manner, the light generation pattern of this light emitting unit is made unique and the effect of disturbance light is decreased.

However, in the conventional prior art 2, although the adverse influence by disturbance light can be avoided, there is a problem with wastefulness in processing an image.

Basically, in the conventional prior art 2, even if carrying out the above-mentioned binarization processing, logic processing of a bit pattern sequence after binarization processing, etc., a "partial read-out" is performed from an image within the capture angle of the image sensor and the read-out area is shifted for every cycle. These processes are unchanging by being targeted at all of the pixels of an image frame outputted from an image sensor. In other words, this method is none other than performing detection and capture of the point light source pertaining to all regions of an image within the capture angle of the image sensor. Therefore, as explained below, wasteful processing cannot be refused.

Assuming that the total number of pixels within the capture angle of the image sensor (full dots) is 1280×960 dots and supposing that a partial read-out of 320×240 dots is possible for this image sensor, the above-mentioned conventional prior art 2 binarization processing, logic processing of a bit pattern sequence after binarization processing, etc. will be performed for each area in which an image of 1280×960 dots is divided into 4×4 blocks. In this case, since one processing is performed applying to the pixels of 320×240 dots for one area, if observing only one processing, the processing load is definitely less. However, the visual recognition size of the point light source located at a distance, namely, the point light source of the light emitting unit, is considerably small. In a lot of cases, this level is completely obtained in one divided area. Thus, processing is inefficient for the other divided areas which do not include a point light source.

DISCLOSURE OF THE INVENTION

Therefore, the purpose of the present invention is to provide an information reception device, information transmission system and information reception method which aim at accelerating information decoding processing by acquiring the region essential for detection of optical modulation from among the capturing angles. Furthermore, the present invention aims at making the position adjustment of the optical modulation region easy.

In accordance with a first aspect of the present invention, there is provided an information reception device including an imaging portion; a light reception portion for light reception of optional information subjected to optical modulation; a specification portion for specifying an optical modulation region contained in the capture angle of the imaging portion; a decoding portion for controlling the light reception portion in order to carry out light reception of the optical modulation region specified by the specification portion and for decoding optional information from the optical modulation content contained in that region; and a reproduction portion for reproducing the optional information decoded by the decoding portion.

In accordance with a second aspect of the present invention, the information reception device according to the first aspect also includes a display portion for displaying a reference marker together with the content imaged by the imaging portion; and a movement portion for optionally moving the reference marker currently displayed on the display portion; where the specification portion specifies an optical modulation region by moving the reference marker by the movement portion.

In accordance with a third aspect of the present invention, the information reception device according to either of the first and second aspects also includes a light reception direction portion for directing light reception of the optical modulation region specified by the specification portion; and a control portion for controlling the light reception portion so that the optical axis coincides with the optical modulation region when light reception has been directed by the light reception direction portion.

In accordance with a fourth aspect of the present invention, in the information reception device according to any of the first to third aspects, the light reception portion includes a light receiving element and an optical system to condense incident light to the light receiving element.

In accordance with a fifth aspect of the present invention, in the information reception device according to any of the first to third aspects, the light reception portion includes a two-dimensional image sensor and an optical system to condense incident light to the image sensor.

In accordance with a sixth aspect of the present invention, the information reception device according to any of the first to third aspects also includes a correlation portion for correlating image data imaged by the imaging portion and the optional information decoded by the decoding portion; and a memory portion for memorizing the correlated image data and the optional information.

In accordance with a seventh aspect of the present invention, the information reception device of the sixth aspect also includes a first judgment portion for judging whether or not light reception of the optical modulation region has been completed by the light reception portion; where the correlation portion correlates image data imaged by the imaging portion and the optional information based on the optical modulation region decoded by the decoding portion when judged that light reception of the optical modulation region has been completed by the first judgment portion.

In accordance with an eighth aspect of the present invention, the information reception device according to the sixth or seventh aspects also includes a reporting portion for reporting result when light reception of the optical modulation region has been completed by the first judgment portion; a second judgment portion for judging whether or not further light reception of the optical modulation region has been directed after report by the reporting portion; and a light reception control portion for initiating light reception of the optical modulation region by the light reception portion when judged that further light reception has been directed by the second judgment portion in the state of having held image data imaged by the imaging portion.

In accordance with a ninth aspect of the present invention, the information reception device according to the sixth or seventh aspect also includes an imaging control portion for controlling the imaging portion so that the optical modulation repeatedly switches on and switches off for specific wavelength light and for imaging the capture angle of switched off timing for the specific wavelength light.

In accordance with a tenth aspect of the present invention, the information reception device according to any of the first to ninth aspects also includes a conversion portion for converting at least the modulation content of the optical modulation region light received by the light reception portion into two types of bit pattern sequences having a low degree of correlation reciprocally; a logic signal output portion for outputting a logic signal corresponding to two types of bit pattern sequences having a low degree of correlation reciprocally and which have been converted by the conversion portion; where the decoding portion decodes the optional information based on output by the logic signal output portion.

In accordance with an eleventh aspect of the present invention, an information transmission system, which has an information output device, includes a selection portion for determining a logic determination of a bit string representing optional information and selecting from either of two types of bit pattern sequences having a low degree of correlation reciprocally, which have been previously prepared based on the determination result; a modulation portion for performing optical modulation of the optional information according to the selection result by the selection portion; an output portion for outputting the optional information which has been optically modulated by the modulation portion; an information reception device, including an imaging portion; a light reception portion for light reception of optional information subjected to optical modulation; a specification portion for specifying an optical modulation region contained in the capture angle of the imaging portion; a light reception control portion for controlling the light reception portion in order to carry out light reception of the optical modulation region specified by the specification portion; a conversion portion for converting at least the modulation content of the optical modulation region light received by the light reception control portion into two types of bit pattern sequences having a low degree of correlation reciprocally; a logic signal output portion for outputting a logic signal corresponding to two types of bit pattern sequences having a low degree of correlation reciprocally which have been converted by the conversion portion; a decoding portion for decoding the optional information based on output by the logic signal output portion; and a reproduction portion for reproducing the optional information decoded by the decoding portion.

In accordance with a twelfth aspect of the present invention, an information reception method includes a specification step for specifying an optical modulation region contained in the capture angle imaged by an imaging section; a light reception control step for controlling a light reception section in order to carry out light reception of the optical modulation region specified by the specification step; a conversion step for converting at least the modulation content of the optical modulation region light received by the light reception control step into two types of bit pattern sequences having a low degree of correlation reciprocally; a logic signal output step for outputting a logic signal corresponding to two types of bit pattern sequences having a low degree of correlation reciprocally which have been converted in the conversion step; a decoding step for decoding the optional information based on output by the logic signal output step; and a reproduction step for reproducing the optional information decoded by the decoding portion.

According to the present invention, the specification portion specifies an optical modulation region contained in the capture angle of the imaging portion. While the decoding portion controls the light reception portion in order to carry out light reception of the optical modulation region specified by the specification portion and decodes optional information from the optical modulation content contained in that region, the reproduction portion reproduces the optional information decoded by this decoding portion.

Consequently, actual processing can be limited to "the optical modulation region contained in the capture angle of the imaging portion" and the above-mentioned purpose, namely, accelerating information decoding processing, can be attained by acquiring the region essential for detection of optical modulation.

The present invention further comprises the display portion to display a reference marker with the content imaged by the imaging portion and a movement portion to optionally move the reference marker currently on this display portion. The specification portion can also specify the optical modulation region by moving the reference marker by the movement portion. Thus, "a region required for detection of optical modulation" can be specified with the reference marker and the movement portion can perform alignment of a subtle region.

Also, the present invention may further comprise a light reception direction portion to direct light reception of the optical region specified by the specification portion and a control portion to control the light reception portion so that the optical axis matches the optical modulation region when directed by the light reception direction portion. Thus, alignment of the region can be accomplished more easily.

In addition, the light reception portion may include a light receiving element and an optical system to condense incident light to this light receiving element. Further, the light reception portion may include a two-dimensional image sensor and an optical system to condense incident light to this image sensor.

In brief, an optional angle of view light reception portion is necessary to receive the light of "the optical modulation region contained in the capture angle of an imaging portion." However, the embodiment containing the latter, namely, the two-dimensional image sensor is preferable based on the fact that a hand blurring revision mechanism can be made unnecessary. As long as the image formation position of the emitted optical modulation light enters within the light receiving surface of the two-dimensional sensor, since correction is possible with image processing even if there is some position blurring, a mechanical hand blurring revision mechanism by means of an actuator, etc. is not necessary.

Moreover, the present invention further comprises the correlation portion to correlate image data imaged by the imaging portion and the optional information decoded by the decoding portion, as well as the memory portion to memorize the correlated image data and the optional information. Thus, the present invention can be applied to various utilization styles, for example, printing frequency management, copyright management, etc. of an image.

Furthermore, the present invention further comprises the first judgment portion to judge whether or not light reception of the optical modulation region has been completed by the light reception portion. The correlation portion correlates image data imaged by the imaging portion and the optional information based on that optical modulation region decoded by the decoding portion when judged that light reception of the optical modulation region has been completed by the first judgment portion.

Alternatively, the present invention may further comprise a reporting portion to report when light reception of the optical modulation region has been completed by the first judgment portion, a second judgment portion to judge whether or not further light reception of the optical modulation region has been directed after report by the reporting portion and a light reception control portion to initiate light reception of the optical modulation region by the light reception portion when judged that further light reception has been directed by the second judgment portion in the state of having held image data imaged by the imaging portion.

Thus, acquisition of an image and reproduction of information can be carried out in separate time intervals, whereby more efficient processing can be attained. Additionally, in this manner when unsuccessful in acquisition of information, only reacquisition of information can be performed without acquiring an image. Thus, wasteful image acquisition can be avoided and increased efficiency can be promoted.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF DRAWINGS

FIG. 3 is a sequence diagram showing the association between a user's operation of the camera cell-phone 22 and the internal operation of the related camera cell-phone 22;

FIG. 10 is a diagram showing a capture angle (for example, 32 degrees×32 degrees) for the optical system of the camera system;

FIG. 11 is a diagram showing a capture angle (for example, 2 degrees×2 degrees) for the optical system of a photodetector system;

FIG. 14 is a graphic diagram showing a candela degree calculation result of an optical tag;

FIG. 17 is a diagram showing the storage codes of a command code section 87 and the meanings of these codes;

BEST MODE FOR CARRYING OUT THE INVENTION

Hereinafter, the preferred embodiments of the present invention will be explained in detail with reference to the drawings.

Additionally, illustration of specific or example numerical values for various details in the following explanation or character strings and other symbols are merely references for a clear understanding of the concept of the present invention. Accordingly, the concept of the present invention should not be limited explicitly to this terminology entirely or in part.

Furthermore, explanation has been omitted which describes details of well-known methods, well-known procedures, well-known architecture, well-known circuit configurations, etc. (hereinafter denoted as "common knowledge") for the purpose of a concise explanation, but does not intentionally exclude this common knowledge entirely or in part. Therefore, relevant common knowledge already known by persons skilled in the art at the time of filing the present invention is naturally included in the following description.

A. FIRST EMBODIMENT

Figure 1A:
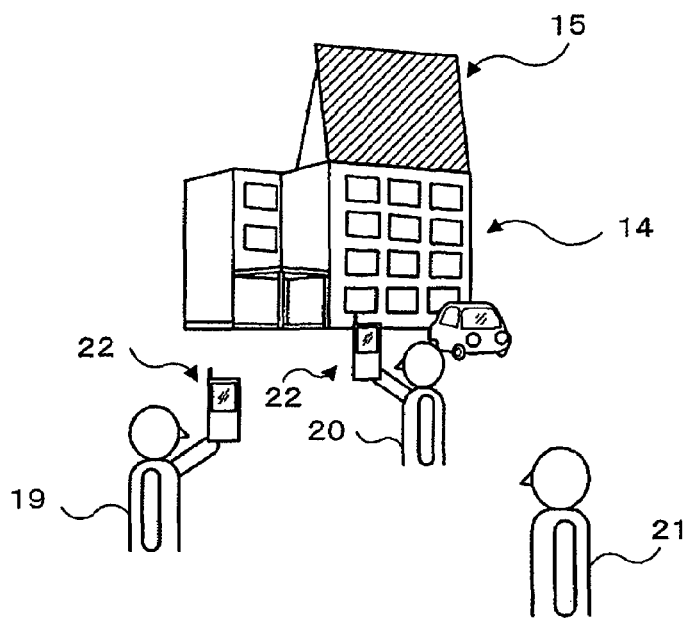
FIGS. 1A~1C are usage status diagrams of an information transmission system in the first embodiment.
Figure 1B:
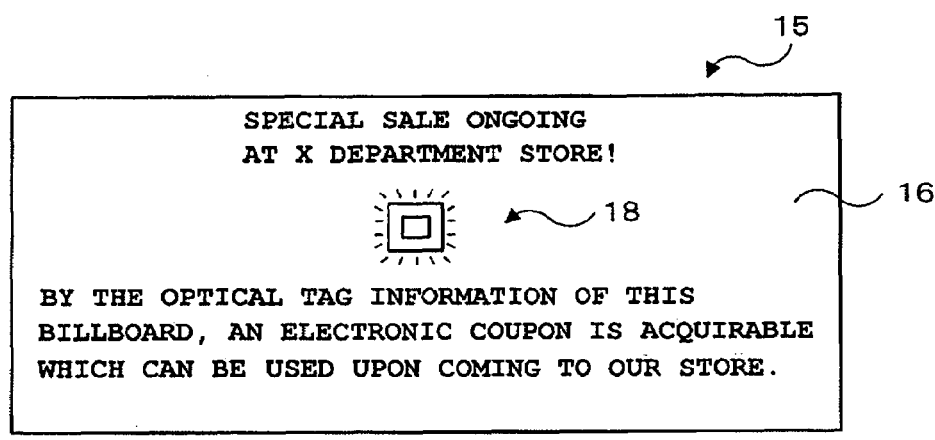
Figure 1C:
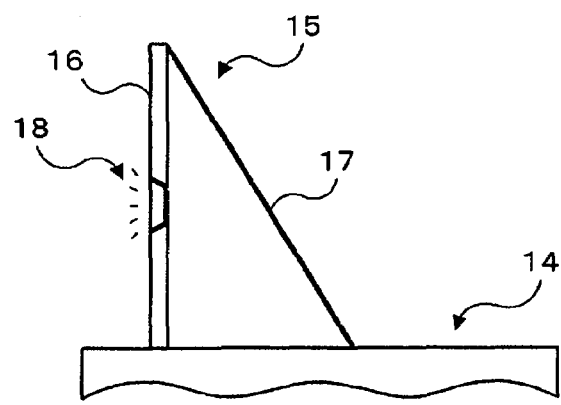

FIGS. 1A~1C are usage status diagrams of an information transmission system in the first embodiment. First, FIG. 1A illustrates an advertisement display board 15 installed on the roof of a structure 14, such as a building. In FIG. 1B, this advertisement display board 15 is shown in a front elevation view and FIG. 1C shows a side view. The billboard 16 depicts a large optional description character string (In FIG. 1B, "SPECIAL SALE ONGOING AT X DEPARTMENT STORE!", "BY THE OPTICAL TAG INFORMATION OF THIS BILLBOARD, AN ELECTRONIC COUPON IS AQUIRABLE WHICH CAN BE USED UPON COMING TO THE STORE."). As shown in FIG. 1C, a back stationary reinforcement 17 supports the billboard 16 from behind. From a distance, the descriptive character string can be visually identified.

An optical tag unit 18 is mounted in an optional position of the billboard 16 (substantially the center portion in the example illustration). The optical tag unit 18 is a point light source which blinks by two pattern sequences and, simply by visual observation of this optical tag unit 18, just the blinking light is visible. By light reception of the blinking light from the optical tag unit 18 through the information reception device (here, represented as a camera cell-phone) corresponding to the information transmission system in the first embodiment, desired digital information (for example, information pertaining to an electronic coupon which can be used at X department store) can be reproduced and displayed on the information reception device.

In the example of FIG. 1A, there are plural persons 19~21 present in a situation where the billboard 16 is visible. Because only some of the persons, the persons 19, 20 (two persons for convenience of the diagram), possess a camera cell-phone 22 (information reception device) corresponding to the information transmission system in the first embodiment, only these two persons 19, 20 can acquire the electronic coupon which can be used at X department store. Since the remaining person 21 does not possess a camera cell-phone 22, this person cannot acquire the electronic coupon.

In addition, the optical tag unit 18 does not necessarily have to be always mounted on a large panel like the billboard 16. Of course, the optical tag unit 18 can also be attached to a small item, such as a merchandise tag. Provided that the installation purpose for the optical tag unit 18 offers various information in relation to a physical entity (the billboard 16 example in FIG. 1) or supplies a specific service (the electronic coupon example in FIG. 1B) to people who come to a certain nearby area (from several meters to about 100 meters), the present invention is not restricted to these example illustrations and can be in any number of embodiments. For example, "an attempt to provide an incentive to users who come to a certain area (comparatively large) in order to draw them to that area," "provide an incentive to users for a certain advertisement (observed on that particular occasion)," "supply further specific information (or a link to a site) more than the information on a billboard, etc. to user terminals automatically," etc.

Here, the optical tag unit 18 is placed on the billboard 16 and the application example distributes an electronic coupon as an incentive to a user who has observed that advertisement on the billboard 16. Also, in this case the "coupon" is an electronic image file. An Internet link destination is specified separately so that the "coupon" can be downloaded from there.

Figure 2A:
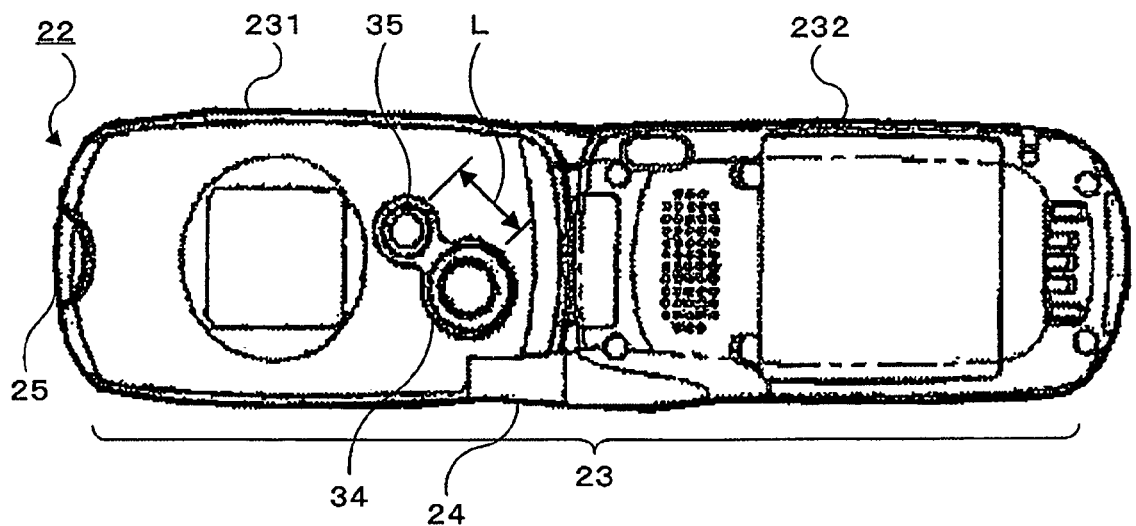
FIGS. 2A~2B are a front elevation view and a rear elevation view of a camera cell-phone 22, respectively, corresponding to the information transmission system in the first embodiment.
Figure 2B:
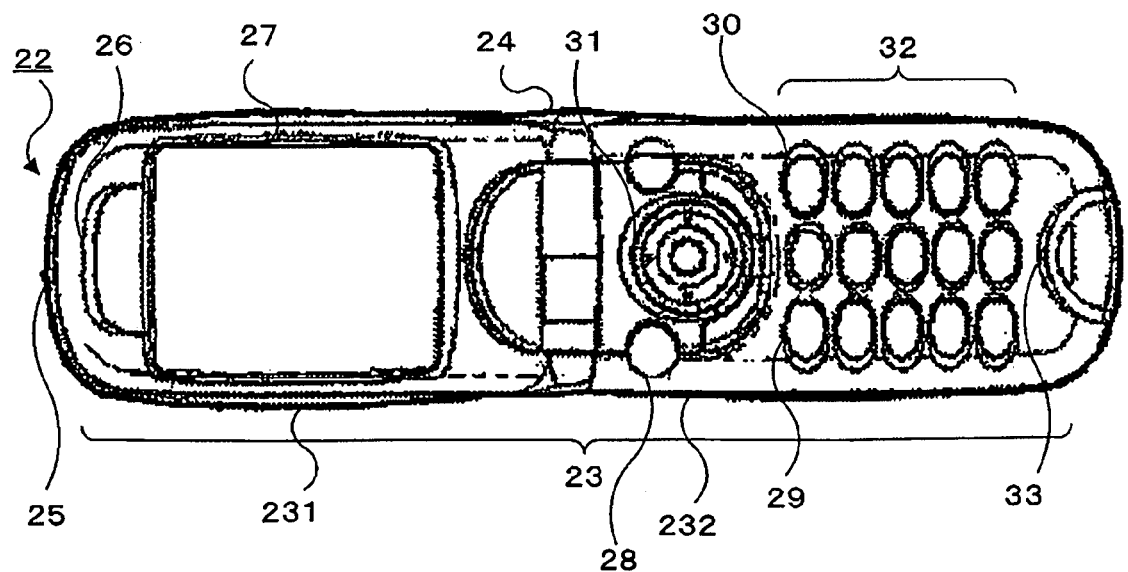

FIGS. 2A–2B are a front elevation view and a rear elevation view of a camera cell-phone 22, respectively, corresponding to the information transmission system in the first embodiment. The camera cell-phone 22 has a body 23 which is foldable with a lid part 231 and a main body part 232. The lid part 231 comprises an antenna 24, a status indicator light 25, a speaker 26, a display section 27 such as a liquid crystal display panel. The main body part 232 comprises a camera key 28, an on-hook button 29, an off-hook button 30, a cursor key 31 (decision instructions by center press detection), a ten-key button group 32, a microphone 33, etc. Also, the back of the lid part 231 comprises a lens 34, a condensing lens 35, etc. Furthermore, the lens 34 and the condensing lens 35 are closely arranged at distance L as much possible to eliminate parallax error (in reference to azimuth difference also called "viewfinder error").

FIG. 3 is a sequence diagram showing the association between a user's operation of the camera cell-phone 22 and the internal operation of the related camera cell-phone 22. Also, the code pattern of the optical tag unit 18 for the desired entry is inputted beforehand by a person providing such information. Moreover, it is preferred that information, such as those to "OBSERVE THE OUTDOOR BILLBOARD OF XXX!," "NOW OFFERING VARIOUS KINDS OF SERVICES WITH AN OPTICAL TAG!," "ACCESS CODE IS XXXXXX," etc. be acquired and disseminated widely. For example, as an advance campaign announcement, this information can be in such styles as in media resembling a television commercial, periodical, etc. or an electronic mail magazine or newsletter to the camera cell-phone 22. "X" denotes optional characters, optional numbers and/or optional symbols. However, this is not a method in which an individual access code is inputted for provision of information. The access code can be inputted and used by anyone.

First, when a billboard 16 having an optical tag unit 18 is discovered, the user of the camera cell-phone 22 inputs an access code (Step S11) and depresses the camera key 28 of the camera cell-phone 22 (Step S12). The camera cell-phone 22 responds to this button actuation and shifts from the ordinary telephone use state (idle or telephone call state) to detection and receive state of an optical tag unit 18 (Step S13, Step S14). As the image captured with the camera is displayed on the display section 27, a small reference marker (refer to the alignment frame 40 of FIG. 4A) is displayed superimposed on that image (Step S15).

Figure 4A:
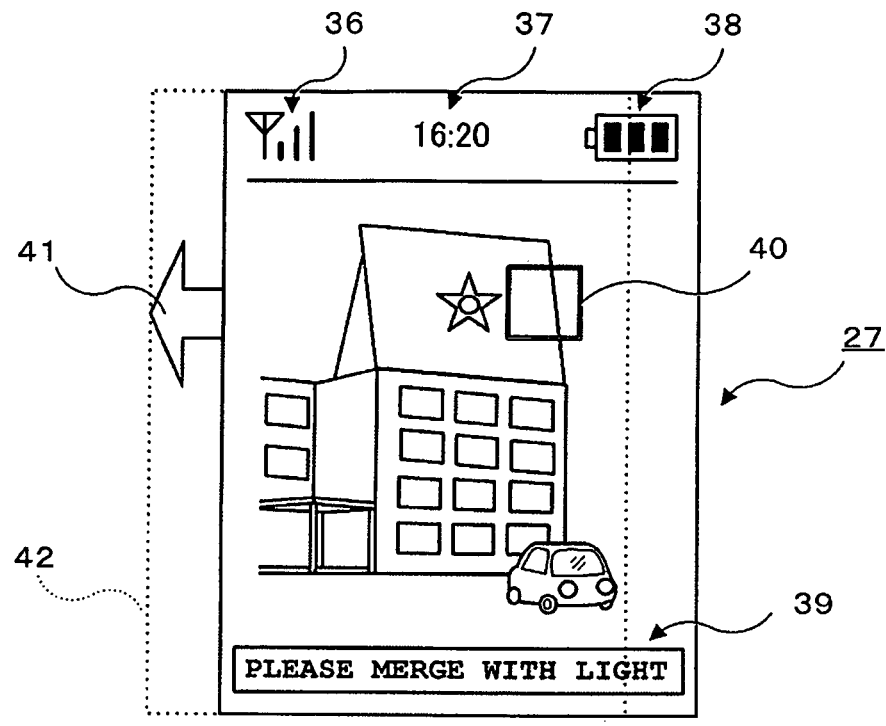
FIGS. 4A~4B are diagrams showing a display example of a display section 27 when an alignment frame 40 is superimposed above the diagram showing the display example of the display section 27 and an optical tag unit 18.

FIG. 4A is a diagram showing a display example of the display section 27. In FIG. 4A, a receive state indicator 36, a current time indicator 37, a battery remaining amount indicator 38, etc. of the camera cell-phone 22 are displayed along the top edge portion of the display section 27. Also, operational guidance messages are displayed along the bottom edge of the display section 27. A camera through image (a dynamic image of a plurality of frames per second) of the camera cell-phone 22 is displayed on the broader range of the display section 27, except for the top edge and bottom edge. For instance, in the drawing example, the through image containing the billboard 16 of FIG. 1A is displayed. The star symbol in the through image is information which typically shows the optical tag unit 18 of FIG. 1B. The blinking light of the optical tag unit 18 is information to be acquired. However, the content of that information cannot be understood by only observing the blinking light. By way of light reception of that blinking light using a prescribed terminal (the camera cell-phone 22), the content of the information is reproduced within the camera cell-phone 22 and displayed on the display section 27 of the camera cell-phone 22.

In the first embodiment, the camera cell-phone 22 does not reproduce the above-mentioned information by processing the entire through image displayed on the display section 27. Only the specific portion enclosed by the small alignment frame 40 in a through image is exclusively processed to reproduce the above-mentioned information. Accordingly, wasteful processing can be avoided and an improvement in information reproduction responsiveness can be promoted. Specifically, the present invention differs from the above-stated conventional prior art 2 in that only a specific region within a through image is processed and the information for the optical tag unit 18 is reproduced.

Importantly, in the example of FIG. 4A, the alignment frame 40 appears not to be above the optical tag unit 18 shown by the star symbol. A white arrow 41 and a dashed line frame 42 indicate for convenience the movement direction of the camera cell-phone 22 required to superimpose the alignment frame 40 above the optical tag unit 18 and the camera image capturing area after movement.

Figure 4B:
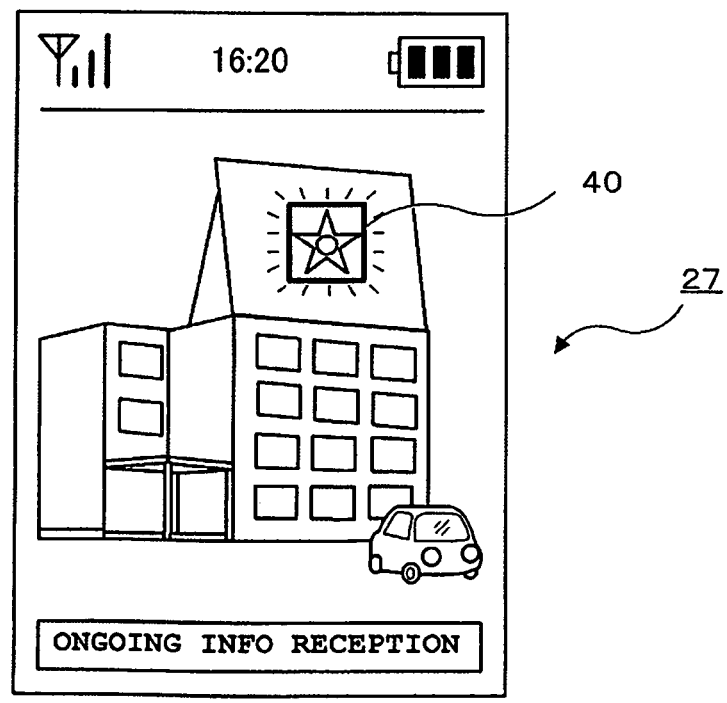

FIG. 4B is a diagram showing a display example of the display section 27 when the alignment frame 40 is superimposed above the optical tag unit 18. In this manner, a user operates the cursor key 31 and superimposes the alignment frame 40 above the optical tag unit 18 (Step S16). The camera cell-phone 22 switches on or blinks the status indicator light 25 as well as otherwise detects that the center of the cursor 31 has been depressed which initiates the information detection processing of the optical tag unit 18 (Step S17).

Figure 5A:
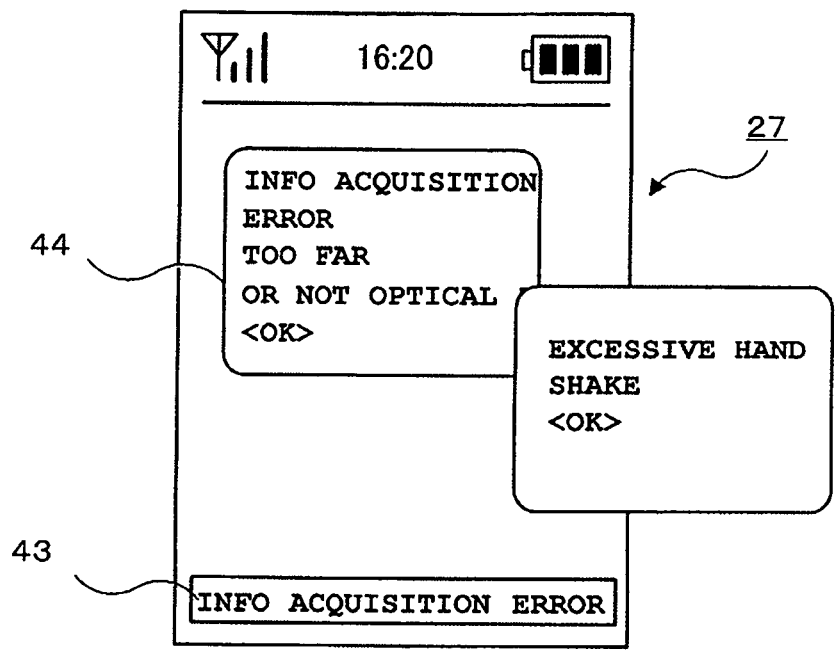
FIGS. 5A~5B are diagrams showing a display example of the display section 27 when information acquisition from the optical tag unit 18 is unsuccessful and a diagram showing a display example of the display section 27 when information acquisition from the optical tag unit 18 is successful, respectively.

FIG. 5A is a diagram showing a display example of the display section 27 when information acquisition from the optical tag unit 18 is unsuccessful. For example, on occasions when information can not be acquired even if a predetermined time elapses or on occasions when accurate information acquisition can not be completed due to the effect of disturbance light, blurring, etc. In such cases as shown in FIG. 5A, a balloon message 44, 45 relating to the failure cause along with an information acquisition failure message 43 are generated and displayed on the display section 27.

Figure 5B:
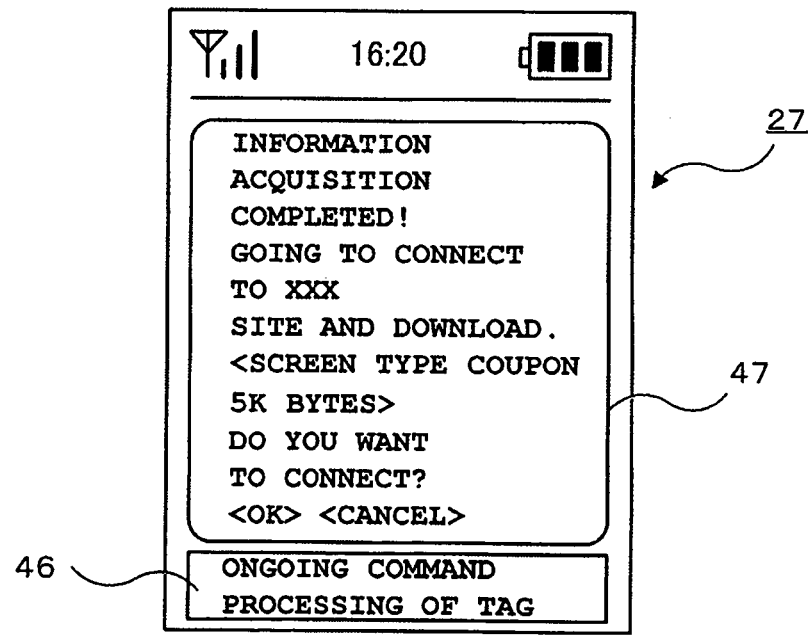

FIG. 5B is a diagram showing a display example of the display section 27 when information acquisition from the optical tag unit 18 is successful. For example, a balloon message 47 containing the text information acquired from the optical tag unit 18 along with an information acquisition successful message 46 are generated and displayed on the display section 27.

During this period, the camera cell-phone 22 executes a detection result display (Step S18). The operation judges whether or not an error exists in a detection result, such as garbled text, etc. (Step S22). When a detection result contains an error, specifically, in the case of "NO" in Step S22, the camera cell-phone 22 reverts to an idle state before executing the processing in Step S22. Conversely, in the case of "YES," processing of the below-mentioned Step S20 is executed. Also, a user performs the start confirmation of action and execution instruction corresponding to the result in Step S18 (Step S19). Furthermore, when information acquisition is successful, for example, execution of the designated command will be performed and the command execution result, such as login to a Web service, information downloaded, etc., will be displayed (Step S20). The user utilizes the acquired information (for instance, coupon use) (Step S21).

Figure 6A:
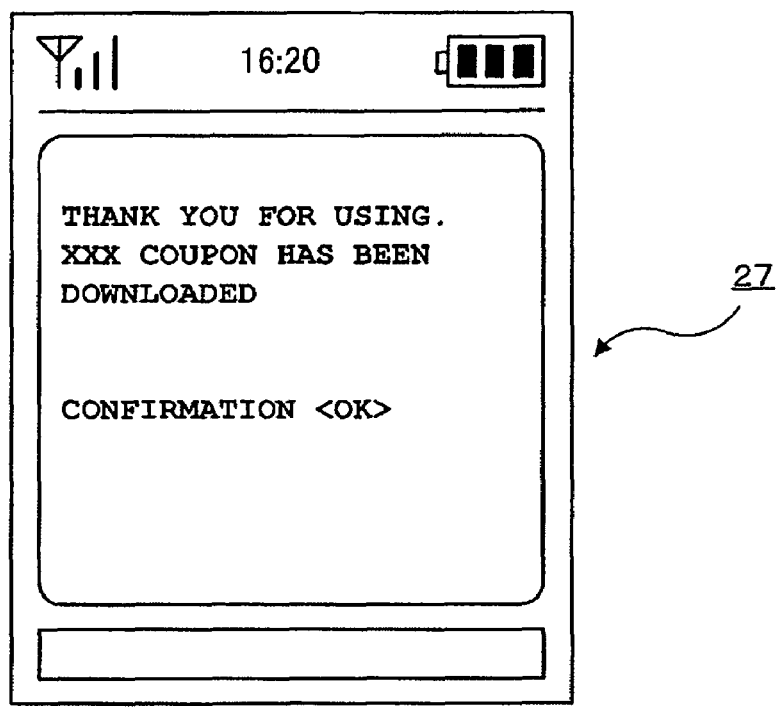
FIGS. 6A~6B are diagrams showing a display example of the display section 27 when downloading a coupon image file and a diagram showing a coupon image, respectively.
Figure 6B:
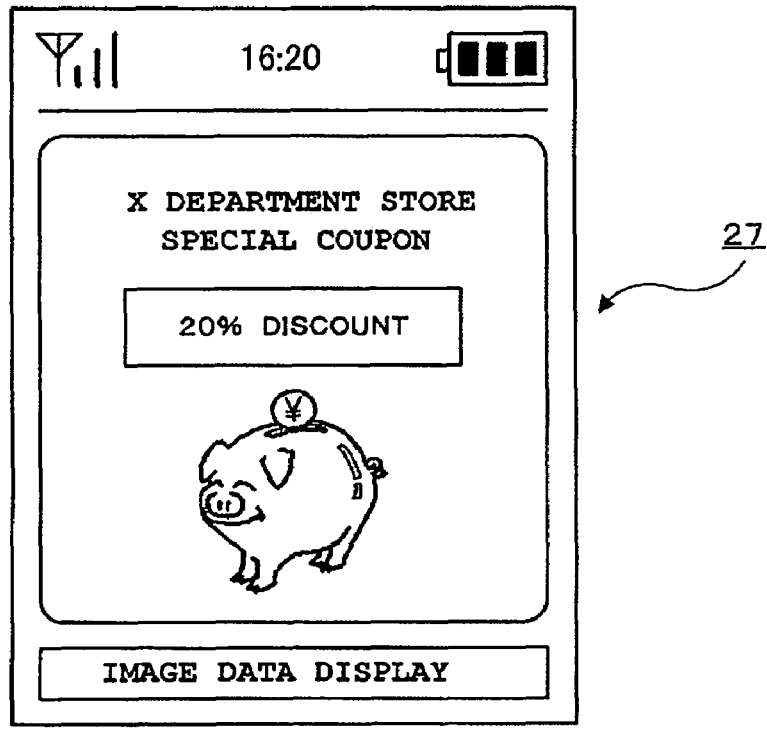

FIG. 6A is a diagram showing a display example of the display section 27 when downloading a coupon image file. Also, FIG. 6B is a diagram showing a coupon image. The user shows the screen of FIG. 6B to X department store salesclerk and uses the displayed coupon.

Figure 7:
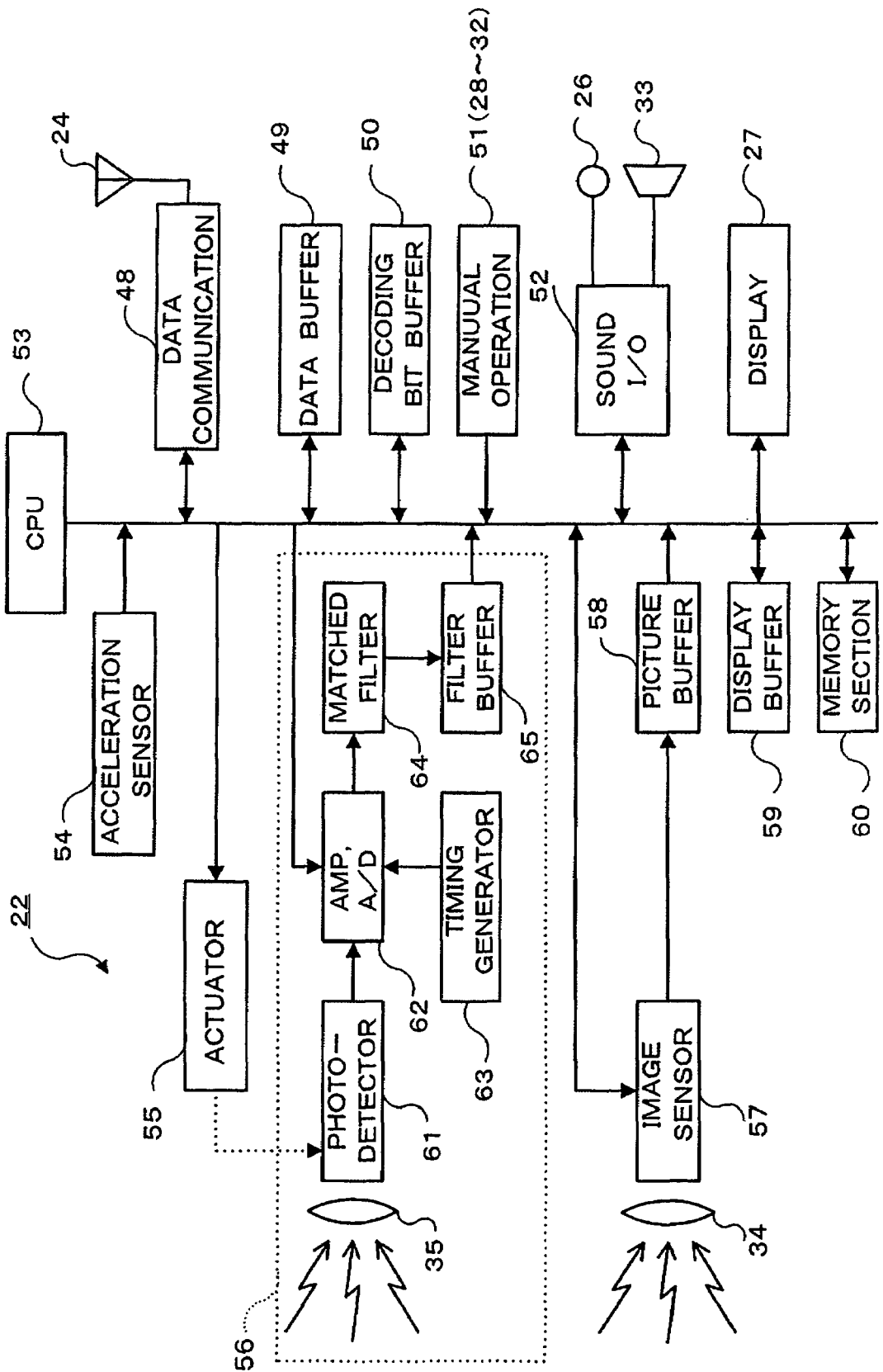
FIG. 7 is an internal block configuration diagram of the camera cell-phone 22 of the first embodiment.

FIG. 7 is an internal block configuration diagram of the camera cell-phone 22 of the first embodiment. As shown in FIG. 7, the camera cell-phone 22 comprises a data communication section 48 including the antenna 24, a data buffer 49, a decoding bit buffer 50, a manual operation section 51 (28~32) including each placement button, such as the camera key 28, a sound input/output section 52 including the speaker 26 and the microphone 33, the display section 27, a CPU 53, an acceleration sensor 54, an actuator 55 for hand blurring correction, a photodetector section 56, the lens 34, an image sensor 57, such as a CCD, CMOS, etc., a picture buffer 58, a display buffer 59, a memory section 60, etc. Furthermore, although the camera cell-phone 22 comprises a power supply section, such as a battery, etc., this section has been excluded in order to avoid a crowded drawing.

The photodetector section 56 comprises the condensing lens 35, a photodetector 61, an amplification and A/D converter 62, a timing generator 63, a matched filter 64 and a filter buffer 65.

There is nothing deserving special mention in the configuration of the camera portion including the lens 34 and the image sensor 57 for image capturing. There should be a function for the purpose of displaying the location of an information light source within the viewfinder function in which the alignment can be adjusted to an optical tag of the user's intention or an actual image. Accordingly, with regard to the frame rate for the camera portion, for example, even if the transmission signal speed is several tens of bits per second or several hundreds of bits per second, there is no problem with the above alignment confirmation. For example, image acquisition capability of about ten frames per second is effective. Also, information, such as the gain control, etc. for the camera portion may be diverted to the setting of the gain control in the photodetector section 56 without terminating in the camera portion.

The photodetector section 56 digitizes the optical variation signal of an optical tag and has a block which carries out a degree of correlation assessment. This will be explained in more detail afterwards.

Figure 8A:
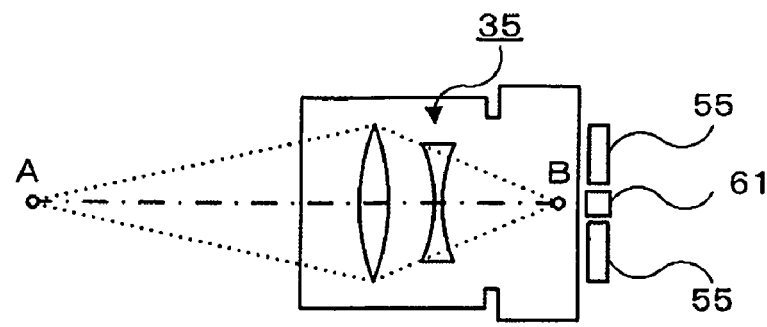
FIGS. 8A~8C are conceptual diagrams of hand blurring correction in the camera cell-phone 22 of the first embodiment.

FIGS. 8A~8C and FIG. 9 are conceptual diagrams of hand blurring correction in the camera cell-phone 22 of the first embodiment. As shown in FIG. 8A, the photodetector 61 is positioned above the optical axis of the condensing lens 35. In the first embodiment, the position of the photodetector 61 changes with the actuator 55 placed side by side of the photodetector 61. The photodetector 61 is aligned above the optical axis which connects the light A of the optical tag unit 18 and the detection point B.

Figure 8B:
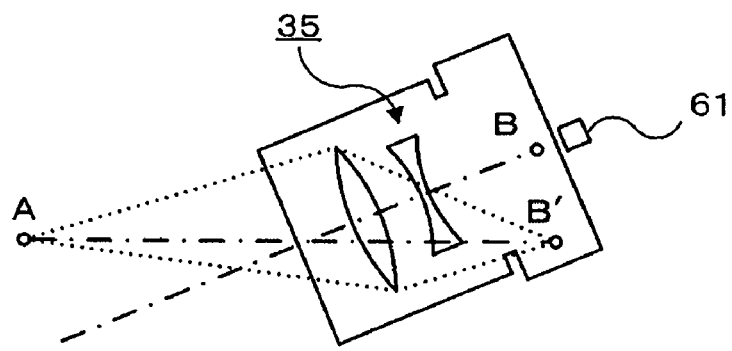
Figure 8C:
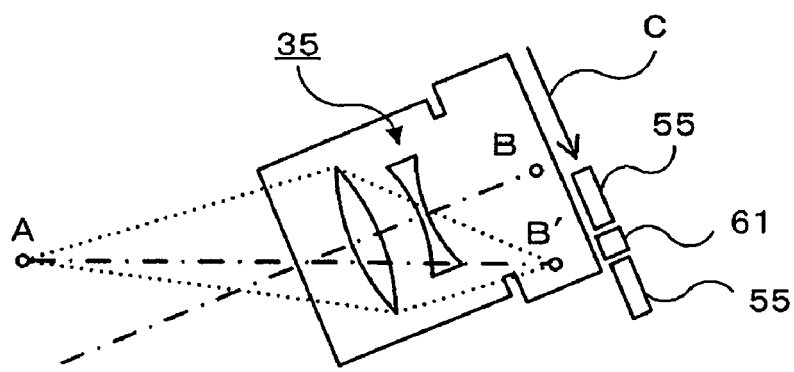

For example, as shown in FIG. 8B, when not comprising the actuator 55, optical axis divergence due to hand blurring arises and becomes a situation where the photodetector 61 is not positioned toward the detection point B. Conversely, as shown in FIG. 8C, when placing the actuator 55 side by side of the photodetector 61 and enabling the photodetector 61 to change positions, the photodetector 61 can be shifted in direction C and optical axis divergence can be corrected. Therefore, even if detected that there is some hand blurring caused by the user, the photodetector 61 can reliably capture light A from the optical tag unit 18.

Figure 9:
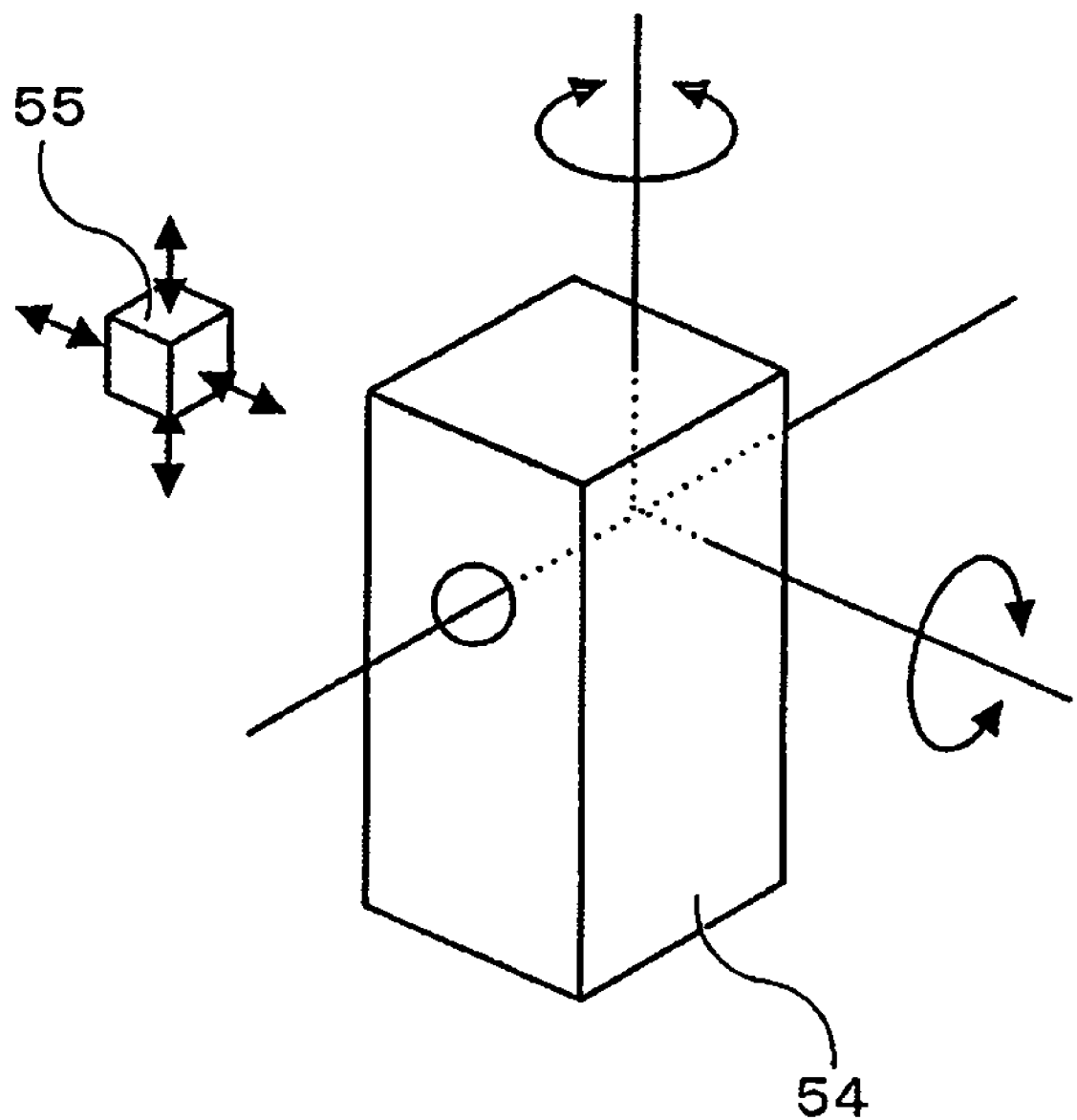
FIG. 9 is a conceptual diagram of hand blurring correction in the camera cell-phone 22 of the first embodiment.

Referring now to FIG. 9, the acceleration sensor 54 detects hand blurring caused by user operation in two axial directions. The CPU 53 generates a hand blurring correction control signal of the magnitude corresponding to the detection signal of the acceleration sensor 54 and drives the actuator 55 with that hand blurring correction control signal. In this manner, correction corresponding to hand blurring can be performed while in the process of adjusting the alignment to an optical tag by acceleration detection of two axes (two axial directions).

Additionally, in the first embodiment, the detection angle of view of the photodetector 61 will be explained as a narrow angle of view of 2 degrees×2 degrees and the range of correction as 1 degree for convenience. In the case of a beginner who is barely experienced in the operation of a camera, this is the angular velocity of about 5 degrees per second and hand blurring is caused in the range of about 1 degree. Since a common digital camera, binoculars, etc. are equipped with a hand blurring correction function of this level, it is considered adequate for the purpose of adjusting the alignment by the narrow angle of view (2 degrees×2 degrees) of the photodetector 61. Furthermore, as described later, it is also possible to exclude this hand blurring correction depending on sensitivity, the detection angle of view, the distance of the optical tag and the standard of magnitude.

Here, a design example which constitutes specifically the operation of the present invention will be illustrated with reference to the arrangement configuration of the lens 34 (the image sensor 57) and the photodetector section 56 in the camera cell-phone 22.

FIG. 10 is a diagram showing the capture angle (wide angle of view about 32 degrees relating to the angle of elevation and the angle of depression) of the lens 34 (the image sensor 57) in the camera cell-phone 22. FIG. 11 is a diagram showing the capture angle (narrow angle of view of about 2 degrees relating to the angle of elevation and the angle of depression) of the photodetector section 56 in the camera cell-phone 22. In the first embodiment, a typical application distance is assumed to be several meters~100 meters. Divergence of the angle of view by the optical system arrangement is disregarded as not being an influence. Also, the two optical axes are assumed to be in parallel. However, it is desirable to consider using the cell-phone 22 at a close range as well as the two optical systems should be arranged (refer to the distance L of FIG. 2B) and mounted as close together as possible. Furthermore, if use at close range is considered most important, it is also effective to be able to perform appropriate adjustment of the angle of the optical axis for the two optical systems by subjecting bias to the hand blurring correction.

As shown in FIG. 10, the lens 34, etc. provides easy adjustment of the alignment from the captured image range in the hand of the user. Also, considering the operation by a common camera mode, this is regarded as the common camera angle of view. Specifically, here an image of 480 dots×480 dots has been acquired within a range having an angle of elevation and angle of depression of 32 degrees×a left-right angle of 32 degrees. Subsequently, as shown in FIG. 11 with regard to the photodetector 61 (the condensing lens 35, etc.) of the photodetector section 56, it is preferable to perform sufficient condensing with a large lens for the purpose of being able to adequately condense a distant signal source. In the first embodiment, the angle of view is performed at an angle of elevation and angle of depression of 2 degrees×a left-right angle of 2 degrees. The angle of view is equivalent to the size of the alignment frame 40.

In the first embodiment, the user's convenience is considered by displaying the alignment frame 40 in a position slightly above the center of the angle of view of a camera image and the alignment frame 40 is linked with the optical system.

Also, in FIG. 10 and FIG. 11, although both have a "double lens" configuration, these examples are for convenience of explanation to specifying that the camera is being used to view a distant target. There is no intention to exclude the optical systems of other configurations (for example, single lens, etc.). More exactly, as the ultimate implementation, the optical lens requires an elaborate lens group for quality assurance of an image. Since these details are well-known for various intentional uses, further explanation has been omitted.

On the other hand, in the optical system of the photodetector 61, the region which performs alignment does not necessarily accurately carry out image formation correctly. Simply, only the applicable angle of view region has to be condensed in the photodetector 61 (with a lens of necessary luminosity). Since aberrations, the depth of field, the essential degree of precision, etc. can be established lower, extremely simplified and low cost configurations, including material, are possible. Besides, adjustment is efficient by pan focusing which considers use distance.

Figure 12A:
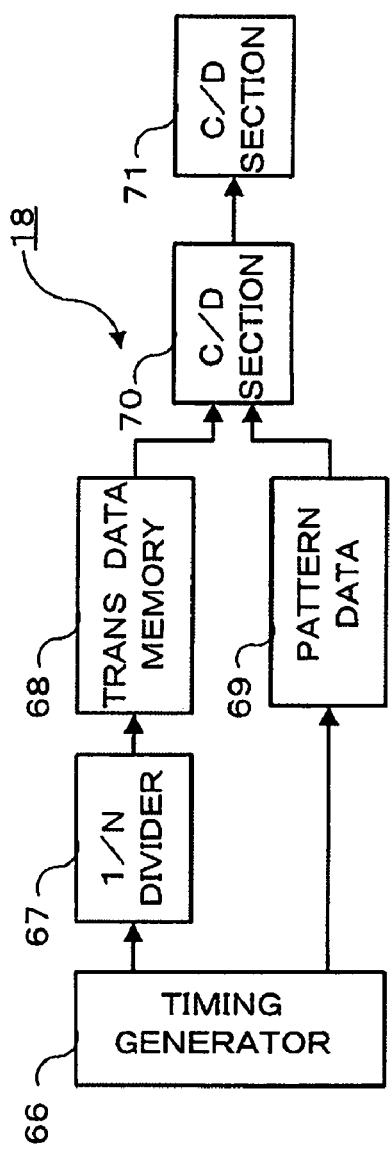
FIGS. 12A~12B are internal block configuration diagrams of the optical tag unit 18.
Figure 12B:
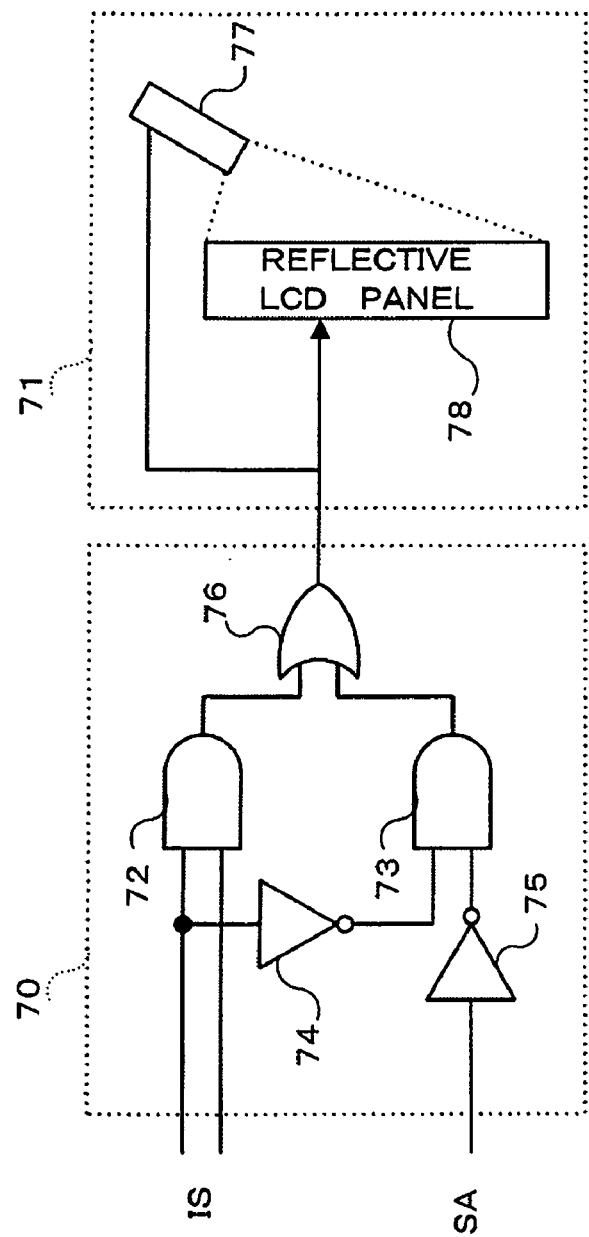

FIGS. 12A~12B are internal block configuration diagrams of the optical tag unit 18. The optical tag unit 18 comprises a timing generator 66, a 1/N frequency divider 67, a transmission data memory 68, a pattern data generation section 69, a first control/drive section 70 and a second control/drive section 71. The first control/drive section 70 has two AND gates 72~73, two inverter gates 74~75, and one OR gate 76. The second control/drive section 71 has a front light 77 and a reflective liquid crystal panel 78.

Figure 13A:
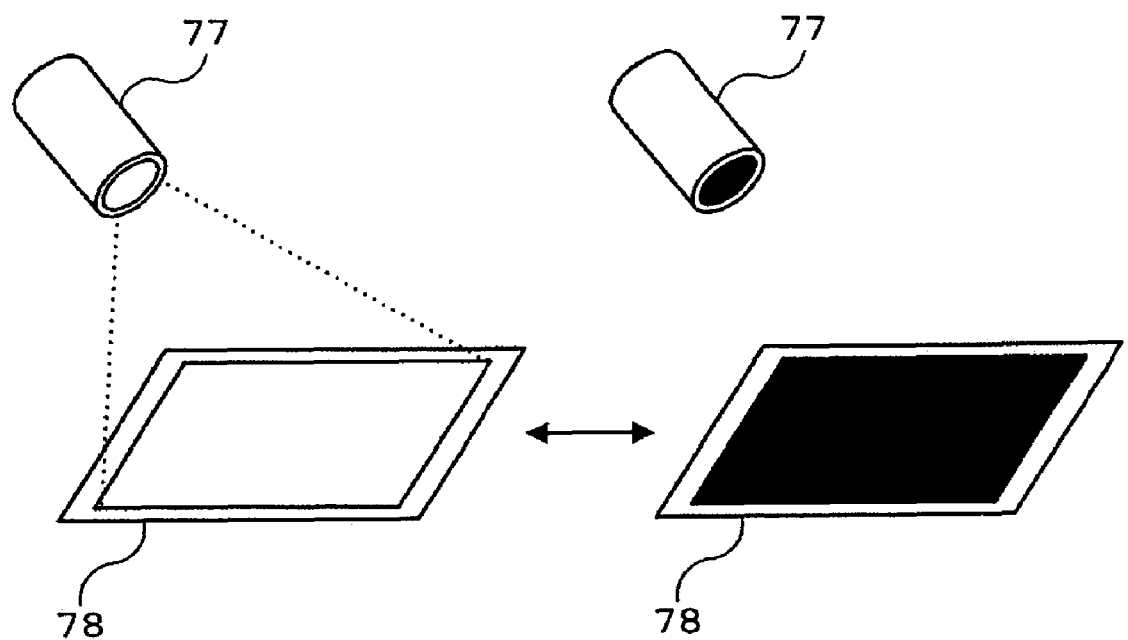
FIGS. 13A~13B are diagrams showing a front light 77 and a reflective liquid crystal panel 78.
Figure 13B:
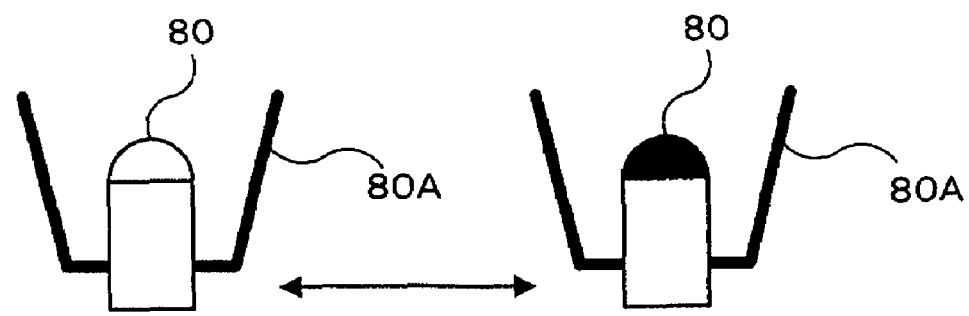

FIG. 13A is a diagram showing the front light 77 and the reflective liquid crystal panel 78. The front light 77 only has to be able to illuminate the reflective liquid crystal panel 78. Namely, as shown in FIG. 13A, simply the front light 77 must be able to illuminate from a place which does not obstruct alignment. Also, the light source of the optical tag unit 18 is not limited to this example. For instance, as shown in FIG. 13B, the light source of the optical tag unit 18 is effective also as a combined configuration including a light source 80 which emits light directly and a hood 80A for the purpose of ensuring wraparound of surrounding light and the lowest luminance possible at the time of switching "OFF." However, because of the potentiality to be configured using lower power, the configuration method of FIG. 13A is preferable due to the fact that sufficient optical variation is securable outdoors during the daytime in fine weather.

Next, the light source optics, distance and area, as well the photodetector sensitivity, dynamic range, S/N (Signal/Noise ratio), etc. will be explained. Below is an approximation example of the actual value of a light source and a detection component. Also, needless to say, the following approximation examples are based on a model which considerably simplifies light intensity related calculation.

Initially, in the first embodiment, the optical tag unit 18 is configured with the front light 77 and the reflective liquid crystal panel 78 as shown in FIG. 13A and, as the environment, it is being used from outdoors during the day in fine weather to outdoors at night.

The size of the reflective liquid crystal panel 78 may be 1 square meter. When the front light 77 is in a light emitting state, the reflection coefficient is 30%. Conversely, when the front light 77 is in a non-light emitting state, the reflection coefficient is 2%. Additionally, the front light 77 can radiate 1,000 lumens (about one home electric light bulb) of light uniformly on the entire surface of the reflective liquid crystal panel 78 (1 square meter).

Generally, the candela degree calculation method is expressed by "candela degree=reflection coefficient×luminance/π."

The illustration in FIG. 14 pertains to when the luminance of the optical tag is calculated in diametrically opposite conditions of:

(a) candela degree XA (surrounding environment: outdoors in fine weather) and (b) candela degree XB (surrounding environment: under a streetlight at night).

FIG. 14 is a graphic diagram showing the candela degree calculation result of an optical tag.

(a) When candela degree is XA (100,000 lux) in environment illumination (logarithm X-axis):

a-1: candela degree (A point) of only the reflective liquid crystal panel 78
(100,000×0.3)/π=9,543 cd (per 1 square meter);

a-2: candela degree (B point) when adding the irradiated portion of the front light 77 presuming that 1,000 lumen of light by the front light 77 is equal to 1,000 lux which carried out spot irradiation of 1 square meter. In this case, the increased amount of candela degree by the front light 77 is 1,000×0.3/π=10 cd (per 1 square meter) and when a-1 candela degree is added becomes 9,559 cd (per 1 square meter); and a-3: candela degree (C point) of only the reflective liquid crystal panel 78 with the front light 77 in a non-light emitting state (100,000×0.2)/π=636 cd (per 1 square meter).

By this result, when candela degree is XA (surrounding environment: outdoors in fine weather), the luminance ratio of the front light 77 when emitting light and when not emitting light is 15:1.

(b) When candela degree is XB (100 lux) in environment illumination (logarithm X-axis):

b-1: candela degree (D point) of only the reflective liquid crystal panel 78 (100×0.3)/π=9.54 cd (per 1 square meter);

b-2: candela degree (E point) when adding the irradiated portion of the front light 77. In this case, the increased amount of candela degree by the front light 77 is 1,000×0.3/π=10 cd (per 1 square meter) and when b-1 candela degree is added becomes 19.54 cd (per 1 square meter); and b-3: candela degree (F point) of only the reflective liquid crystal panel 78 with the front light 77 in a non-light emitting state (100×0.2)/π=0.6 cd (per 1 square meter).

By this result, when candela degree is XB (surrounding environment: under a streetlight at night), the luminance ratio of the front light 77 when emitting light and when not emitting light becomes 32:1.

As described above, this proves that in a bright environment, such as outdoors during the day in fine weather, etc., an ample range of fluctuation is obtainable by environment light reflection. Conversely, in a dark environment at night, etc., this also proves that an ample range of fluctuation is obtainable by the candela degree difference from the front light 77.

Furthermore, when candela degree is examined, even though these values can be observed as they are for a short distance, a dynamic range of 9559: 0.6=42 dB is obtained. In fact, since there is an optical meter with a dynamic range of about 45 dB even in an actual situation, when employing strong noise resistance, such as spread spectrum, etc. of the modulation method described later, it is also possible to measure these values as they are currently. Since a highly precise photodetector and an A/D bit number consisting of multiple bits (8 bits or more) are necessary, in the first embodiment as a method to configure a terminal cheaply even of the current device, the gain (depending upon the circumstances, also the lens diaphragm) of the photodetector is controlled. As shown in the trapezoid graphic frame 81 of FIG. 14, the following gain adjustments are performed.

(a) Being bright, such as in a fine weather outdoor environment, etc., when the range of fluctuation is larger, the gain is decreased (also using the lens diaphragm, etc. in addition to that) and made not to be saturated.

(b) Being dark, such as outdoors at night, etc., when the range of fluctuation is smaller, the gain is increased.

When accomplished in this manner by being combined with environment illumination conditions, control which finishes by an A/D converter of about 8 bits with a dynamic range of about 20 dB is attained. Additionally, since the information which controls the gain of the photodetector performs gain control minutely in order that the camera system can capture normally with likewise fewer dynamic ranges, also the system of the photodetector may controlled by diverting this information.

Actually, the candela degree of the optical tag unit 18 is observed with the photodetector 61 of a separate terminal (camera cell-phone 22). Since the photodetector of the present invention is a single unit, it is comparable to the photodiode usually used in an image sensor (the image sensor 57). The size of the photosensor can be sufficiently large by as much as severalfold~tenfold. Thus, even if carrying out high speed operation, ample sensitivity and dynamic range can be obtained. In fact, for the purpose of being able to observe the optical tag unit 18 in the viewing angle of 2 degrees×2 degrees, the panel size is 1 square meter. Since optical variation can be detected to the limit of the angle of view within 30 meters when the photodetector 61 is a narrow angle of view of 2 degrees×2 degrees, this becomes extremely good detection.

Figure 15:
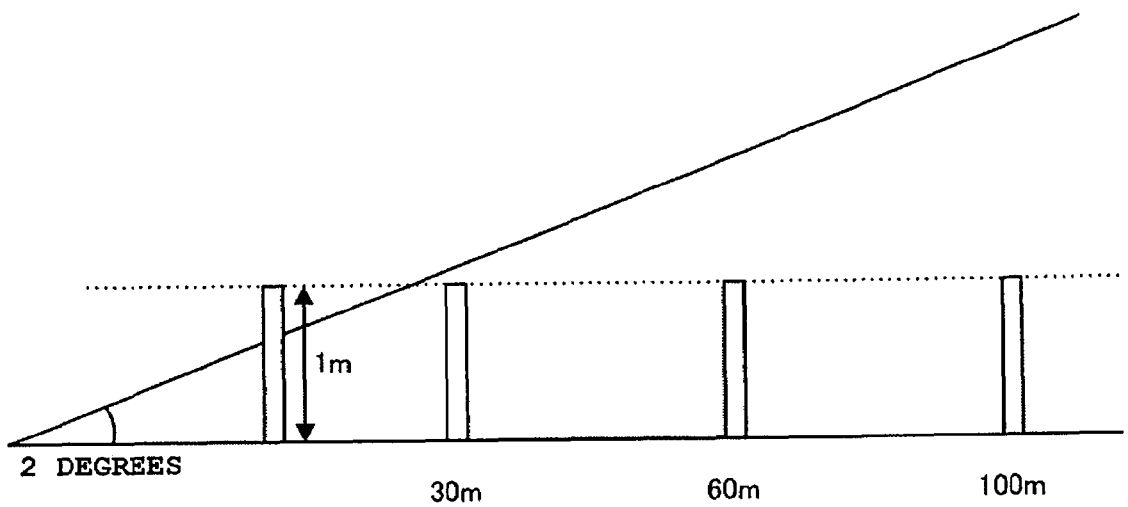
FIG. 15 is a detection conceptual diagram of a photodetector 61.

FIG. 15 is a detection conceptual diagram of the photodetector 61. As shown in FIG. 15, optical variation is detectable to the limit of the angle of view at close range (generally within 30 meters) assuming the angle of view of the photodetector 61 is 2 degrees×2 degrees. Additionally, at a distance beyond 30 meters, for example, upon reaching a distance of 60 meters and with a panel size of 1 square meter, the surrounding luminance and power are averaged in which the optical variation becomes $\frac{1}{4}^{th}$ and, at a further separated distance, for example, becomes $\frac{1}{9}^{th}$ at 90 meters. Upon practical use, although based on gain control and the degree of precision of the A/D, when fluctuation itself of the original optical tag unit 18 is observed under certain conditions, the optical variations are at sufficiently high ratios, such as "15:1, "32.1, etc. Thus, even if using a panel size of 1 square meter, it is possible to set the application distance at about 100 meters. As an example, when the exposure setting is properly carried out for a target subject containing an area greater in magnitude than the pixels of even the digital camera level and even if at an extremely great distance, there is strong evidence that white paper and black paper can be distinguished and imaged.

Moreover, in order to carry out stabilized detection at even greater distances, there are corresponding possible methods such as by using a larger panel and the front light 77 with higher light intensity, etc., by highly precise hand blurring correction, by making the detection angle of view for the photodetector narrower, etc. Also, conversely, when being at a relatively close range, the hand blurring correction mechanism can be omitted and a method can be considered which uses a detection angle with a margin.

Next, the data format and modulation/demodulation of an optical tag will be explained.

Figure 16:
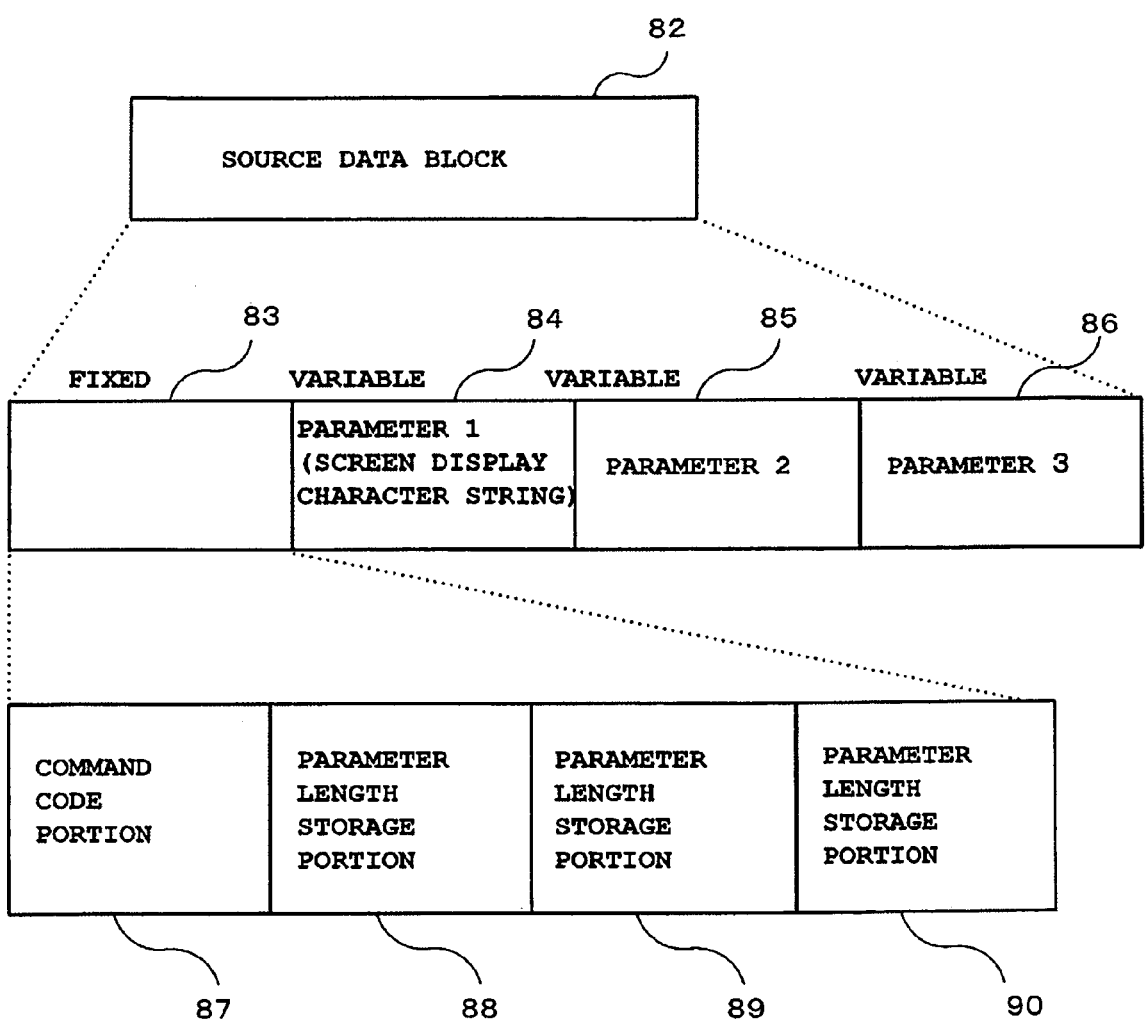
FIG. 16 is a format structural diagram of the data format.

FIG. 16 is a format structural diagram of the data format. A source data block 82 comprises a fixed length header block 83 and variable length parameter blocks 84~86 which continue after the leading block 83 (although there are three in the first~third parameter blocks of FIG. 16, this number of blocks is an example). The header block 83 has a command code portion 87, a first parameter block byte length storage portion 88, a second parameter block byte length storage portion 89 and a third parameter block byte length storage portion 90. The actual length (byte length) of the $1^{st}$~$3^{rd}$ parameter blocks 84~86 are stored in the first~third parameter block byte length storage portions 88~90.

FIG. 17 is a diagram showing the storage codes of the command code section 87. As shown in FIG. 17, for example, the command code portion 87 stores the codes from "0 to "6." These codes are commands for the purpose of directing operation of the terminal (cell-phone) and can control applications based on acquired data, such as cellphone web access, E-mail, a scheduler, etc. Incidentally, the case of only parameter "1 in code "0 is equivalent to the conventional prior art 2.

Figure 18:
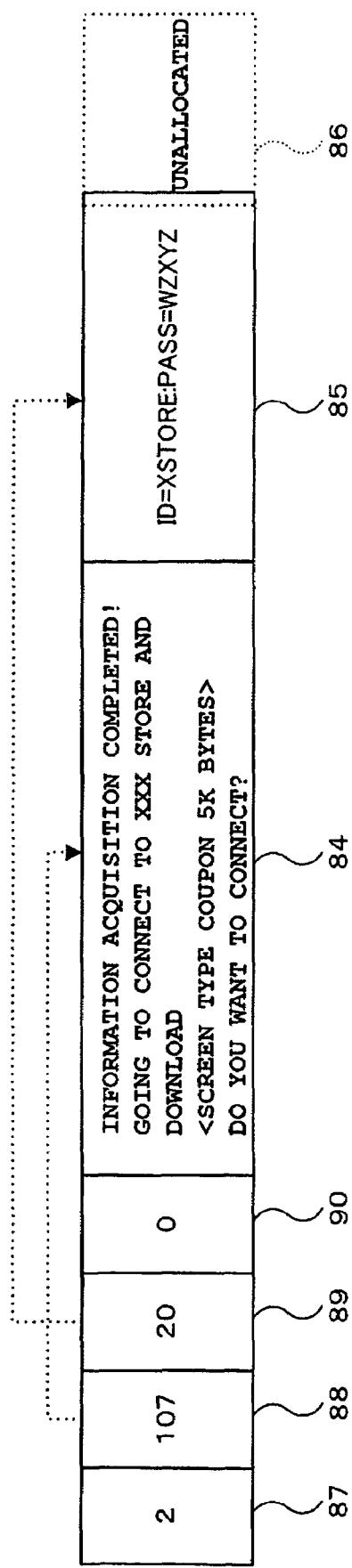
FIG. 18 is a diagram showing an example of data.

FIG. 18 is a diagram showing an example of the data. In this example, code "2 is set in the command code portion 87 as well as codes "107," "20," and "0 are set in the first~third parameter block byte length storage portions 88~90, respectively of the header block 83. Also, the above-mentioned display information "INFORMATION ACQUISITION COMPLETED! . . . DO YOU WANT TO CONNECT?" of FIG. 5B and access information (ID an password) essential for connection are stored in the first parameter block 84 and the second parameter block 85, respectively. In the example of FIG. 18, the third parameter block 86 is unallocated.

Figure 19:
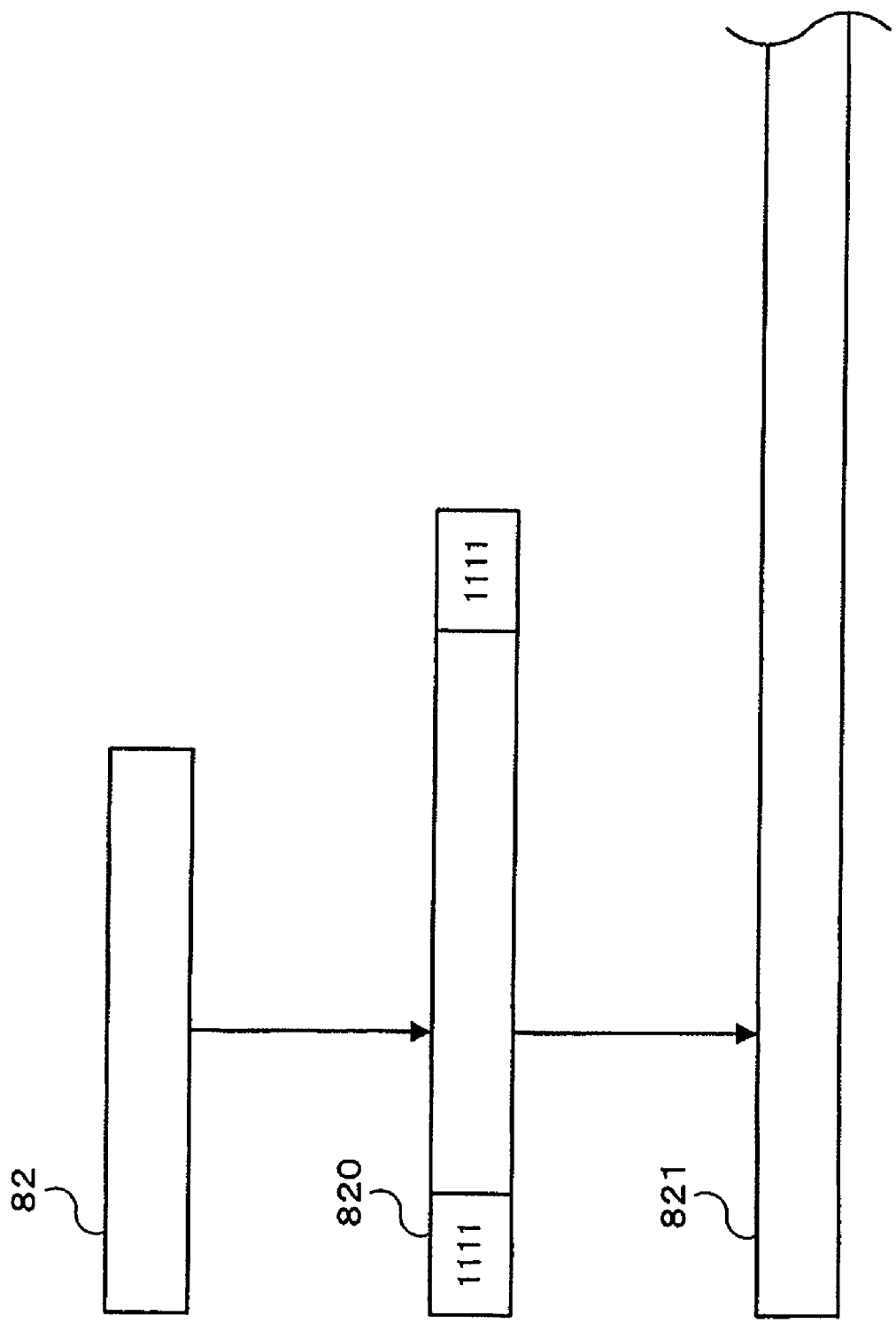
FIG. 19 is a process diagram of the optical tag unit 18.

FIG. 19 is a process diagram of the optical tag unit 18. As shown in FIG. 19, when the source data block 82 is received, the optical tag unit 18 performs data compression, error correction and adds a flag sequence, which is used to generate a data block 820. Also, "ON" and "OFF" control of luminescence is carried out using a data block 821 in which the data is converted into two types of bit pattern sequences having a low degree of correlation, reciprocally.

Figure 20:
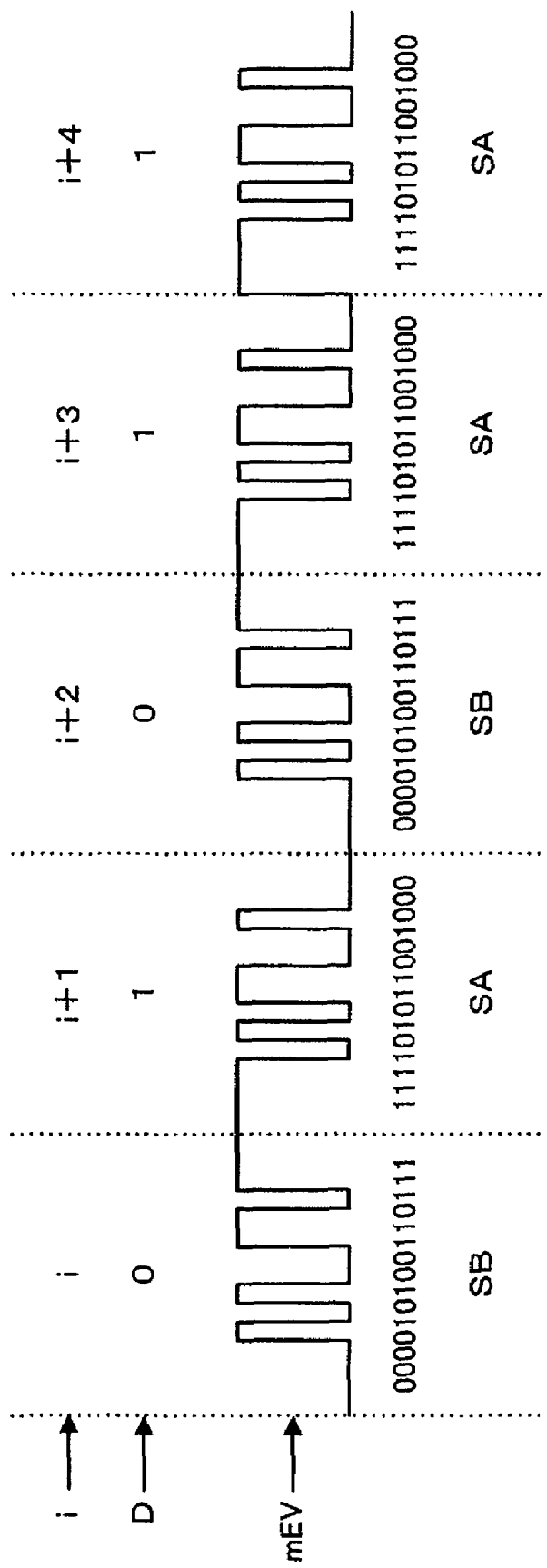
FIG. 20 is a diagram of the pattern spreading method.

FIG. 20 is a diagram of the pattern spreading method of a bit pattern sequence. In the first embodiment, the length of the bit pattern sequences (SA, SB) is lengthened. Each has 15 bits with SA="111101011001000 and SB="000010100110111. At this stage, the minimum "ON/OFF" time slot (the minimum cycle of the timing generator 66 of FIG. 12A) of the optical tag unit 18 is 1 millisecond, the time necessary to transmit 1 bit is 15 milliseconds and the bit rate of the pair is about 67 bits per second. However, since the text is most important of the data transmitted, the actual bit rate is considered greater than this as data compression exceeds redundancy with error correction. Also, supposing that a certain frame ultimately became 50 bytes and the time period required for detection is 50×15=0.75 second, one frame can be acquired in a 0.75 second. Nevertheless, supposing data acquisition is from some time point in the middle of a frame, acquisition of information becomes possible in 1.5×2=3 seconds at the worst.

Next, details of the modulation processing carried out in the terminal (camera cell-phone 22) will be explained. First, with regard to synchronization, in the case of code spreading modulation, there is a need to take synchronization at both the optical tag unit 18 and the terminal (camera cell-phone 22). In the first embodiment, since camera cell-phone 22 is a terminal having a communication function in the terminal side, it is simple to acquire independent synchronization by the above required accuracy with the optical tag unit 18. Otherwise, there is also the possible method of shifting the detection timing of the terminal side by constant phase step until detection is successful.

In the present invention, in view of the fact that observation at a continuous quantity is being carried out by the photodetector 61, as the suitable method for such synchronization and detection, the start timing for one cycle of a pattern is acquired by using what is called the peak in a matched filter output. This applies a synchronization supplement (using a SAW device with a GHz strap) by means of a SAW (Surface Acoustic Wave) matched filter as in, for example, CDMA (Code Division Multiple Access) communication, etc., to the kHz bandwidth of the first embodiment.

Figure 21:
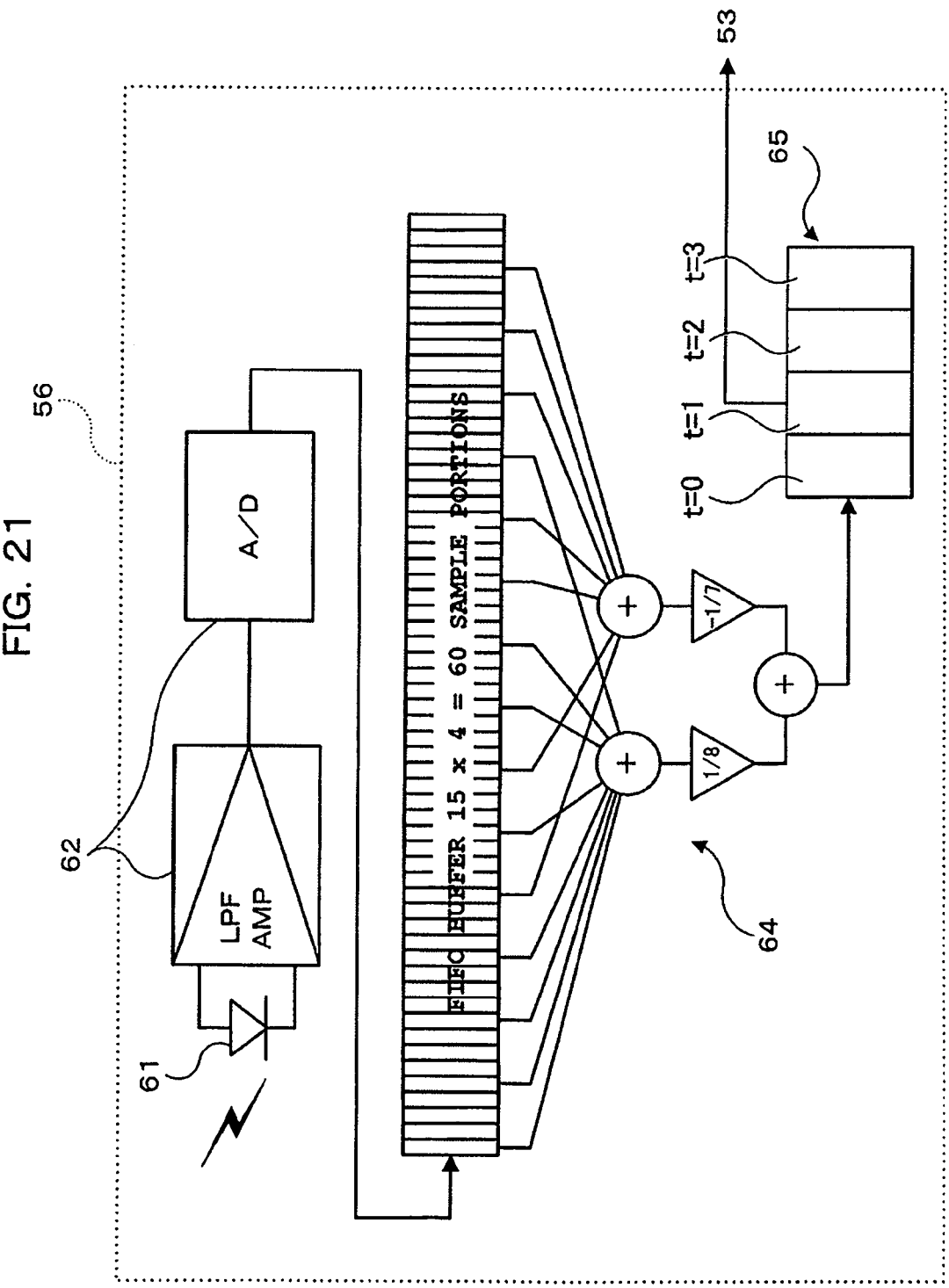
FIG. 21 is a conceptual structure diagram of a photodetector 56 of the camera cell-phone 22.

FIG. 21 is a conceptual structure diagram (equivalent to the internal details of the dotted line part of FIG. 7) of the photodetector 56 of the camera cell-phone 22. In the first embodiment, the optical value in the observed target angle of view and being gain controlled is appraised in a pattern code time slot for 4 times a cycle, namely, A/D is sampled at 4 kHz, and entered into a FIFO (First-In-First-Out) buffer. Although this sampling clock phase may be asynchronous as a light source (the optical tag unit 18), the cycle error needs to be constantly supplied. Since the buffer lengths are 15 bits that are code patterns sampled 4 times a cycle, 60 sample portions are sequentially stored in the FIFO buffer. Every 4 specified addresses of the FIFO buffer are extracted. While performing sum total calculation and weighting, the matched filter creates a data group equivalent to code bit 1 and a data group equivalent to code bit 0. In addition, the CPU sequentially reads the FIFO data by which sampling has been performed and can be calculated with software.

The range of the matched filter indicates the correlation value of an incoming signal as:

Maximum: 255×8/8+(0×7)/7=255

Minimum: 0×8/8−(255×7)/7=255 and at the time of DC (Direct Current) input is 0×8/8−(255×7)/7=0. However, there is detection synchronization being taken until the target pattern begins to be inputted. When not recognizing the presence of a target pattern, the positive or negative smaller value will be used.

Figure 22:
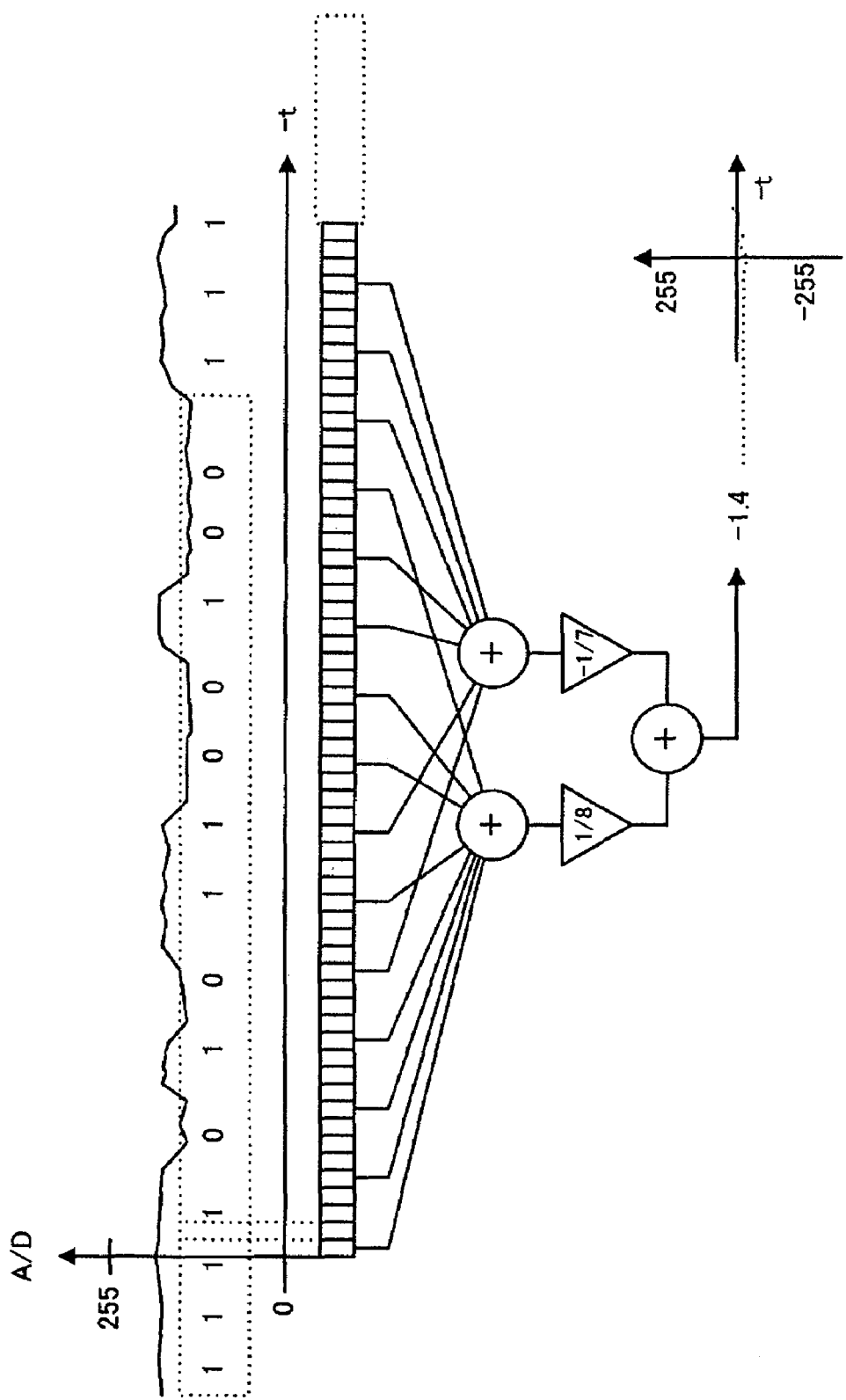
FIG. 22 is a status diagram of when phasing at a certain time (4 coinciding bit portions=16 shifted sample portions) is out of synchronization although the target pattern signal has been inputted.

FIG. 22 is a status diagram of when phasing at a certain time (4 coinciding bit portions=16 shifted sample portions) is out of synchronization although the target pattern signal has been inputted. FIG. 22 illustrates the time-oriented transition of the data sampled values stored in the FIFO buffer. Actual observation, as shown in this diagram, constitutes a minute signal change as compared with an actual detection scale (MAX×255). In fact, as shown in FIG. 22, noise rides along with the observational data, but supposing that there is first level at "140 and a second level at "120 for the purpose of simplification, the output of this filter is approximately −1.

Figure 23:
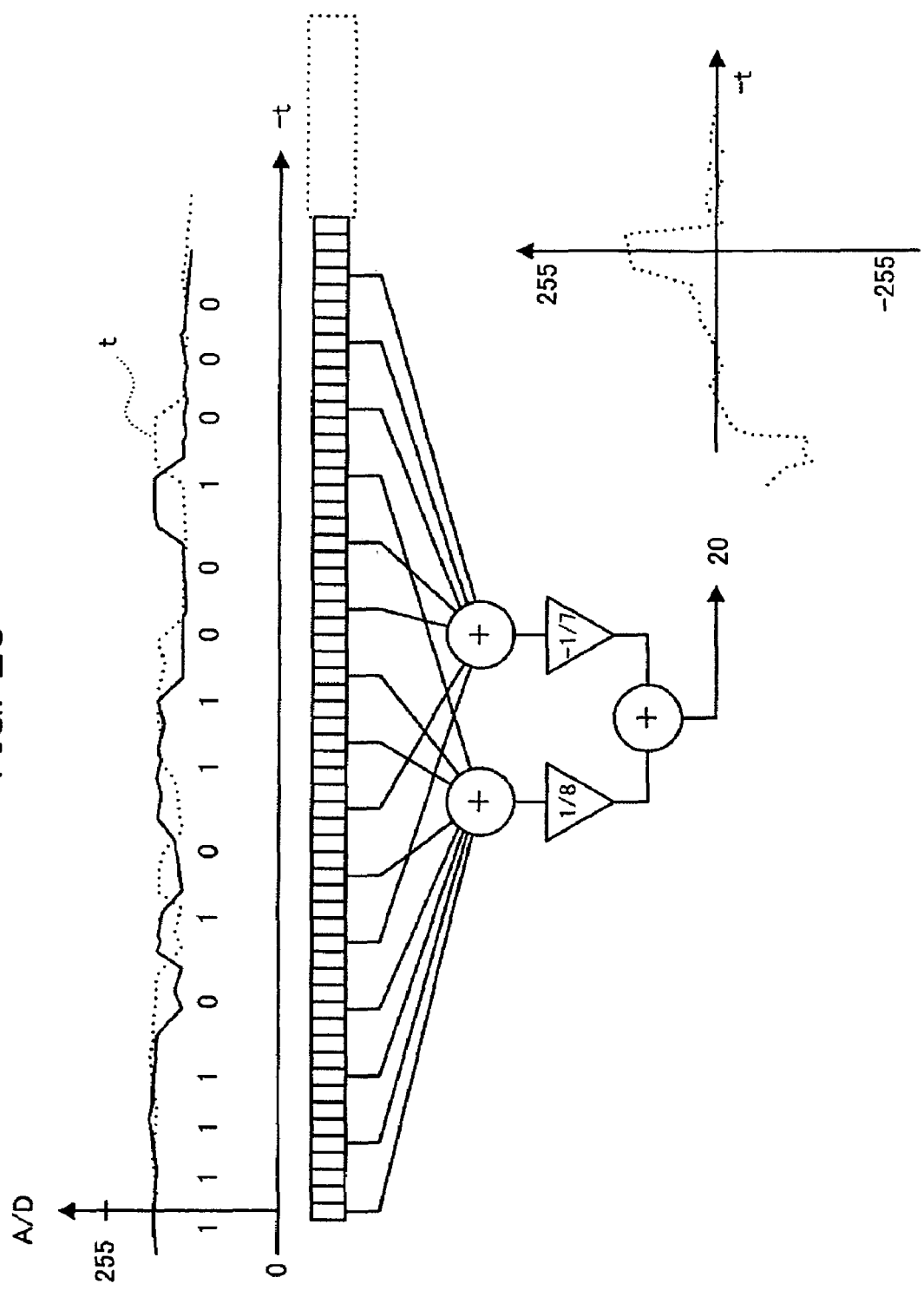
FIG. 23 is a status diagram when detection phasing coincides.

FIG. 23 is a status diagram when detection phasing coincides. In this state, the output generates a range of fluctuation "20 for the added pattern. Then, this peak continues for the most part during the time period of four samples (to the position of top dotted line in the diagram) and the output declines rapidly. Actually, in a case where the observation signal, for example, can be detected in a bright condition "140 or in a dark condition "120, if the output of each sample time is calculated, only 4 sample time periods in which phasing is synchronized will show a peak of "20 and the others become "−1.4. Thus, since a peak can be detected very simply, it is easy to combine the detection timing subsequent to that. The filter output is stored in the FIFO buffer for four samples as shown in FIG. 21.

Figure 24:
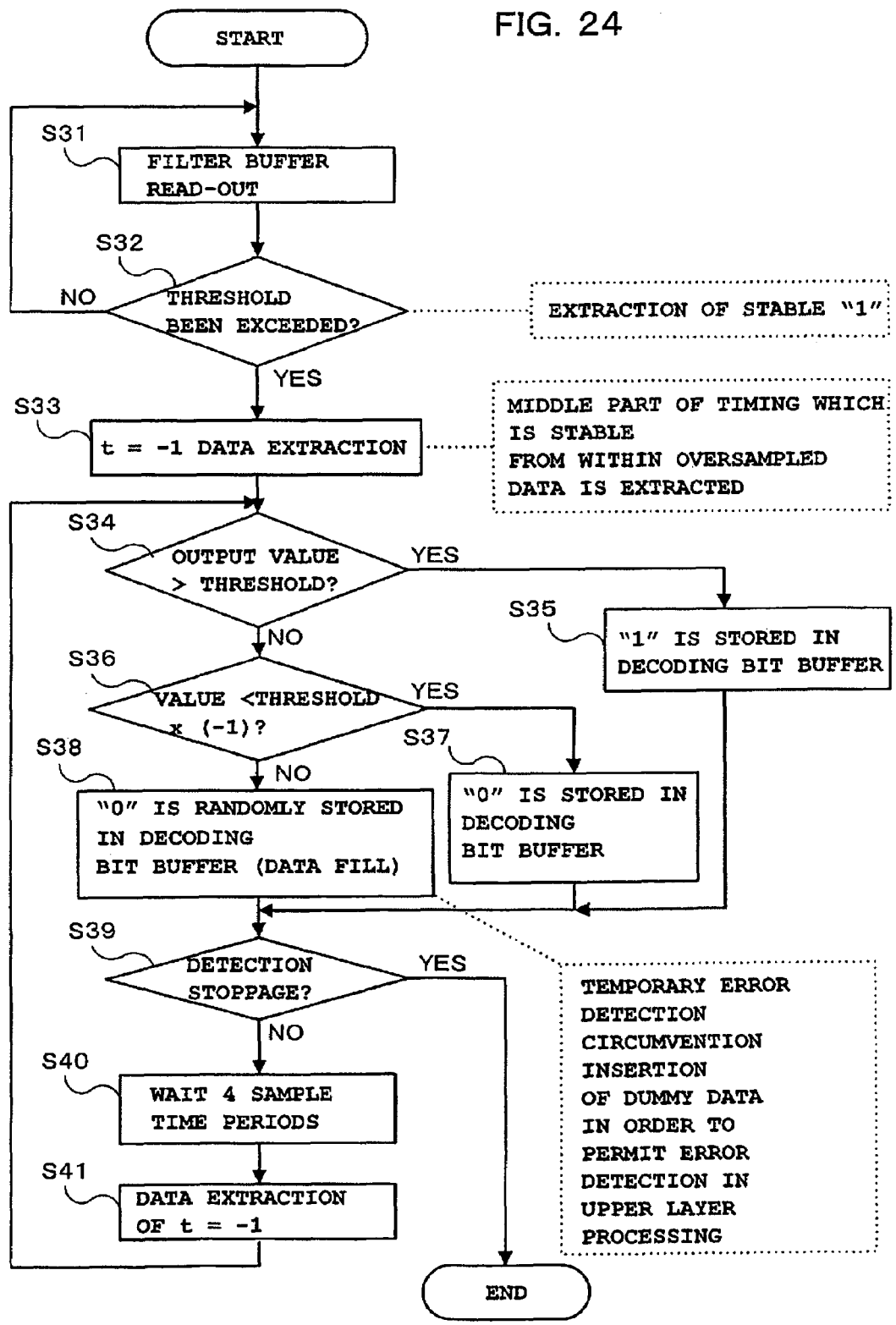
FIG. 24 is a flow chart diagram showing processing where the CPU determines the 0/1 bits from the FIFO buffer before storing them in the decoding bit buffer 50.

FIG. 24 is a flow chart diagram showing processing where the CPU determines the 0/1 bits from the FIFO buffer before storing each bit string in the decoding bit buffer 50. Since each bit string is decoded and stored in this processing, some errors are integrated in the decoding bit buffer 50. Subsequently, frame detection (in this embodiment, the beginning data frame and following ones to the end) or as error detection blocks are extracted and error correction performed. Afterwards, processing which decodes the transmitted source data block is carried out.

Specifically, the data of the filter buffer 65 is initially read-out (Step S31). In order to perform extraction of a stable "1, processing determines whether or not the threshold has been exceeded for 4 sample time periods in succession (Step S32).

When the threshold has been exceeded 4 sample time periods in succession, the t=−1 data (middle part of timing which is stable from among the data subjected to oversampling: even −2 may be acceptable) is extracted (Step S33). Next, processing determines whether or not the filter output value exceeds the threshold (Step S34). When the filter output value exceeds the threshold, "1 is stored in the decoding bit buffer 50 (Step S35). If the filter output value does not exceed the threshold, processing determines whether or not the filter output value exceeds the threshold× (−1) (Step S36). Then, when the filter output value exceeds the threshold×(−1), "0 is stored in the decoding bit buffer 50 (Step S37). If the filter output value does not exceed the threshold×(−1), "0 is randomly stored (data fill) in the decoding bit buffer 50 (Step S38). Subsequently, processing determines the presence of a detection stoppage from a higher ranked sequence (Step S39). When the presence of a detection stoppage from a higher ranked sequence has been determined, processing will be concluded. Conversely, when there has been no detection stoppage, since processing waits for 4 sample time periods (Step S40), the extraction of t=−1 will be performed again (Step S41) and processing subsequent to the above-mentioned Step S34 will be repeated.

As described above according to the first embodiment, the following effects will be acquired:

1. Because the sensor (the photodetector 61) is exclusively used for performing reception of data communications, the data transfer speed, in other words, the delay time until acquisition of information or the transmission rate can be accelerated in support of the user-friendliness of the conventional prior art 2 of capturing the actual camera angle of view image as well as the location and information in the same process.

2. With regard to the light modulation processing, because of having buffering and arithmetic processing relative to one data, the sensor has an extremely expedient processing configuration.

3. Since hand blurring correction has been added to the optical system of the photodetector 61, stable detection can be achieved even if it is a terminal carrying out hand imaging by a narrow detection angle of view.

4. Because the present invention is applied to an application style which uses outdoor advertising and a cell-phone together, consequently, a limited service promotion by an advertiser becomes possible. Also, a quantitative measurement of advertising effectiveness for outdoor advertising can be achieved. On the other hand, the present invention is effective for a user in naturally improving name recognition to an advertisement with a billboard accompanied by a special offer of information.

5. Furthermore, for example, the present invention can be targeted at a very large area as compared with an IC tag or an offer of information by a two-dimensional code with a camera, etc. Additionally, since an offer of information can be combined with a physical entity, such as a billboard, etc., distinctive advertising effectiveness can be enhanced.

6. Moreover, since the present invention makes it possible to insert various communication coordination commands into the transmission data, an extremely effective offer of information becomes feasible.

7. Since the present invention applies pulse modulation which accomplishes code spreading, even a weak optical signal can be stabilized and detected.

8. In view of the fact that the matched filter is formed relative to an oversampled contiguous data structure, phase synchronization doubling of the optical tag unit and the terminal side can be simply acquired.

9. Because the optical tag unit 18 is configured with a combination of the front light 77 and the reflective liquid crystal panel 78, optical variation can be stabilized in various situations not only indoors, but from outdoors during the day in fine weather to outdoors at night.

10. As the arrangement means can be considered as the billboard 16 and the optical tag unit 18, these are easily recognizable to the user as well as superior advertising effectiveness can be realized.

11. Because gain control, etc. of the photodetector 61 is carried out from the exposure control data of the camera, optimal dynamic range and sensitivity combined with usage conditions are obtainable.

Furthermore, with regard to modulation of the ultimate light source, the conventional prior art 2 can only accomplish a modulation method which spreads bits in a pattern as a method of transmitting by a high noise S/N ratio from discrete and completed image data. However, since high speed and continual quantitative observation can be accomplished with the method according to the photodetector 61 in the first embodiment, the characteristic features of the detection data can be obtained by a simpler modulation method. For instance, pulse modulation may be accomplished in the frequency (10 kHz, etc.) of a specific carrier, etc. In addition, even the change modulation for the pulse frequency is performed in the same manner.

Moreover, as described even in the conventional prior art 2, it may be possible to exclude the above-mentioned alignment adjustment in the camera and on the screen and, in the function of the photodetector 61 only, perform adjustment of the alignment with just a simple lens tube or a telephoto optical finder, display and operation.

B. SECOND EMBODIMENT

Apart from the above, although in the above-mentioned first embodiment the photodetector 61 is used as a light reception means for light reception of the luminescent spot of the optical tag unit 18, the present invention is not restricted to this. What is necessary is to have an angle of view corresponding to the size of the information offering object (the optical tag unit 18). For example, this may be an image sensor, such as a CCD, CMOS, etc., or a plurality of photodetectors arranged on a plane surface.

Hereinafter, the second embodiment using an image sensor, such as a CCD, CMOS, etc, will be explained.

Figure 25:
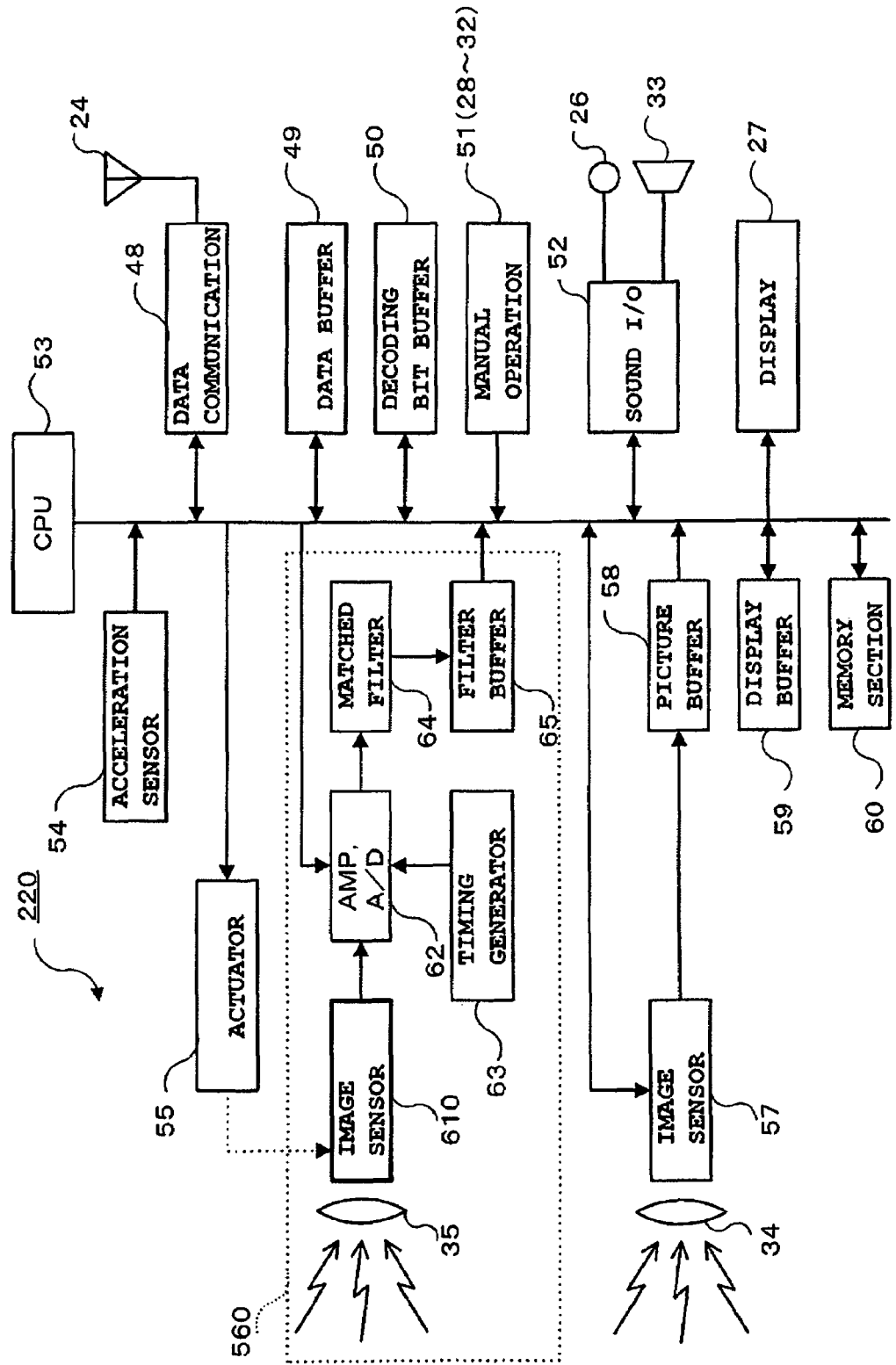
FIG. 25 is an internal block configuration diagram of the camera cell-phone 220 in the second embodiment.

FIG. 25 is an internal block configuration diagram of the camera cell-phone 220 in the second embodiment. As shown in FIG. 25, the camera cell-phone 220 has the feature point of comprising an image sensor for communication 610 in place of the image sensor 57 of the photodetector 61 in the above-described first embodiment (hereinafter, also denoted as the "image sensor for communication 610 to be clearly distinguished from the "image sensor 57).

Specifically, the camera cell-phone 220 in the second embodiment comprises a data communication section 48 including the antenna 24, a data buffer 49, a decoding bit buffer 50, a manual operation button section 51 (28~32) including each placement button, such as the camera key 28, a sound input/output section 52 including the speaker 26 and the microphone 33, a display section 27, a CPU 53, an acceleration sensor 54, an actuator 55 for hand blurring correction, the image sensor section for communication 560, the lens 34, the image sensor 57, such as a CCD, CMOS, etc., a picture buffer 58, a display buffer 59, a memory section 60, etc. Furthermore, although the camera cell-phone 220 comprises a power supply section, such as a battery, etc., this section has been excluded in order to avoid a crowded drawing.

The image sensor section for communication 560 comprises the condensing lens 35, the image sensor for communication 610, an amplification and A/D converter 62, a timing generator 63, a matched filter 64 and a filter buffer 65.

Like the above-mentioned first embodiment, there is nothing deserving special mention in the configuration of the camera portion including the lens 34 and the image sensor 57. There should be a function for the purpose of displaying the location of an information light source within the viewfinder function in which the alignment can be adjusted to an optical tag of the user's intention or an actual image. Accordingly, with regard to the frame rate for the camera portion, for example, even if the transmission signal speed is several tens of bits per second or several hundreds of bits per second, there is no problem with the above alignment confirmation. For example, image acquisition capability of about ten frames per second is effective Also, information, such as the gain control, etc. for the camera portion may be diverted to the setting of the gain control in the image sensor section for communication 560 without terminating in the camera portion.

The image sensor section for communication 560 digitizes the optical variation signal of the optical tag unit 18. Further, this section block performs degree of correlation assessments and, fundamentally, functions the same as the photodetector 56 (refer to FIG. 7) of the first embodiment. However, the image sensor section for communication 560 of this second embodiment differs by comprising a two-dimensional image sensor (the image sensor for communication 610) which has a plurality of photoelectric transducers (photoelectric conversion elements of pixels) configured with a CCD, CMOS, etc. as opposed to the photodetector section 56 of the first embodiment which comprises one photoelectric transducer (the photodetector 61).

The photodetector 61 and the image sensor for communication 610 are both devices which "transform light into an electronic signal." The image sensor for communication 610 differs by comprising a plurality of photoelectric transducers (a plurality of pixels) as opposed to the photodetector 61 comprising a single photoelectric transducer. However, there may be less number of pixels of the image sensor for communication 610 than the image sensor 57. Specifically, the image sensor for communication 610 simply only performs detection of the luminescent spot in an arrow angle of view and without caring about low resolution (for example, 30 dots×30 dots) as compared with the image sensor 57 which requires capturing image quality.

The light source (the optical tag unit 18) which emits information samples a 1 kHz baseband signal at the rate of 4 times similar to the above-mentioned first embodiment. Accordingly, since the frame rate of the image sensor for communication 61 becomes 4,000 frames per second and $1/400^{th}$ second=0.25 millisecond, it is only essential to have a device designed so that the necessary dynamic range can be filled at a fixed shutter speed of a 0.25 millisecond.

When 30×30 dots as previously stated concerning the resolution of the image sensor for communication 610, the data rate of frames for all pixels read-out in this case is expressed as 30×30×4,000=3,600,000 frames per second as 1 dot of 8-bit data.

In the case of a common image sensor of an ordinary VGA (640×480 dots), 30 fps (frames per second) is the conventional bandwidth. Since this data rate of 30 bps is 640×480×30=9,216,000 dots per second, when it is the data rate (3,600,000 frames per second) level of the image sensor for communication 610 of the second embodiment, this can be achieved with a surplus.

Next, the relationship between specifically designed numerical values and the detection angle versus distance and target size will be explained. The use state is assumed to be the same as FIG. 1A of the above-stated first embodiment. Also, the distance between the optical tag unit 18 and the terminal (the camera cell-phone 220) should be been assumed as 50 meters and the size of the light source of the optical tag unit 18 assumed to be a 10 cm×10 cm square (10 cm on a side).

Figure 26:
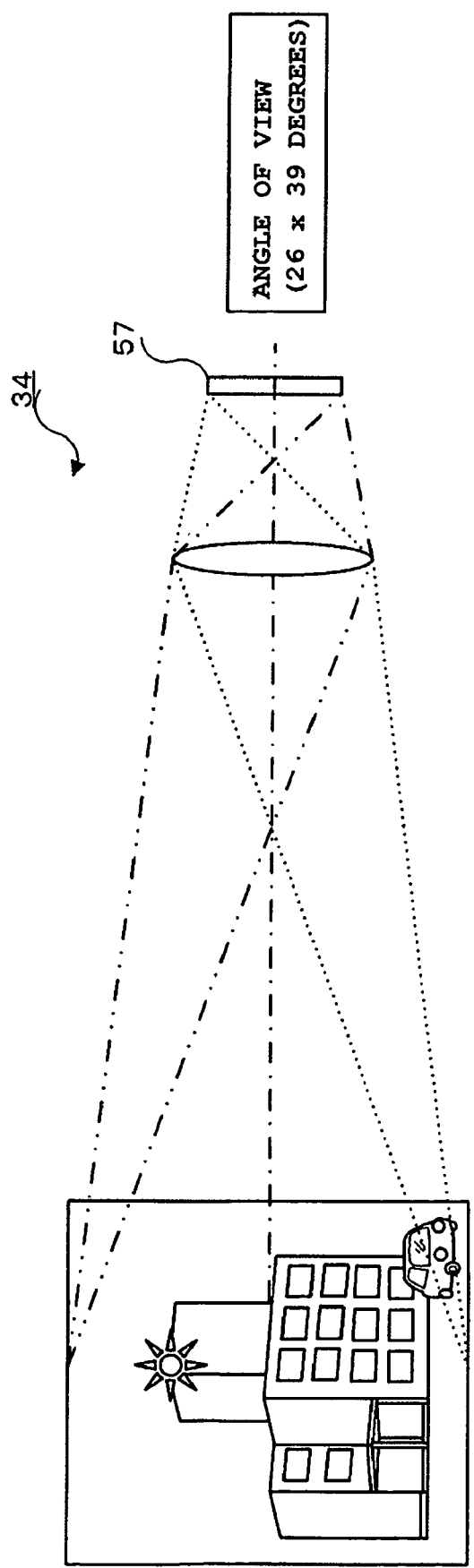
FIG. 26 is a diagram showing a capture angle (wide angle of view of about 26 degrees×39 degrees) of a lens 34 (an image sensor 57) in the camera cell-phone 220 of the second embodiment.
Figure 27:
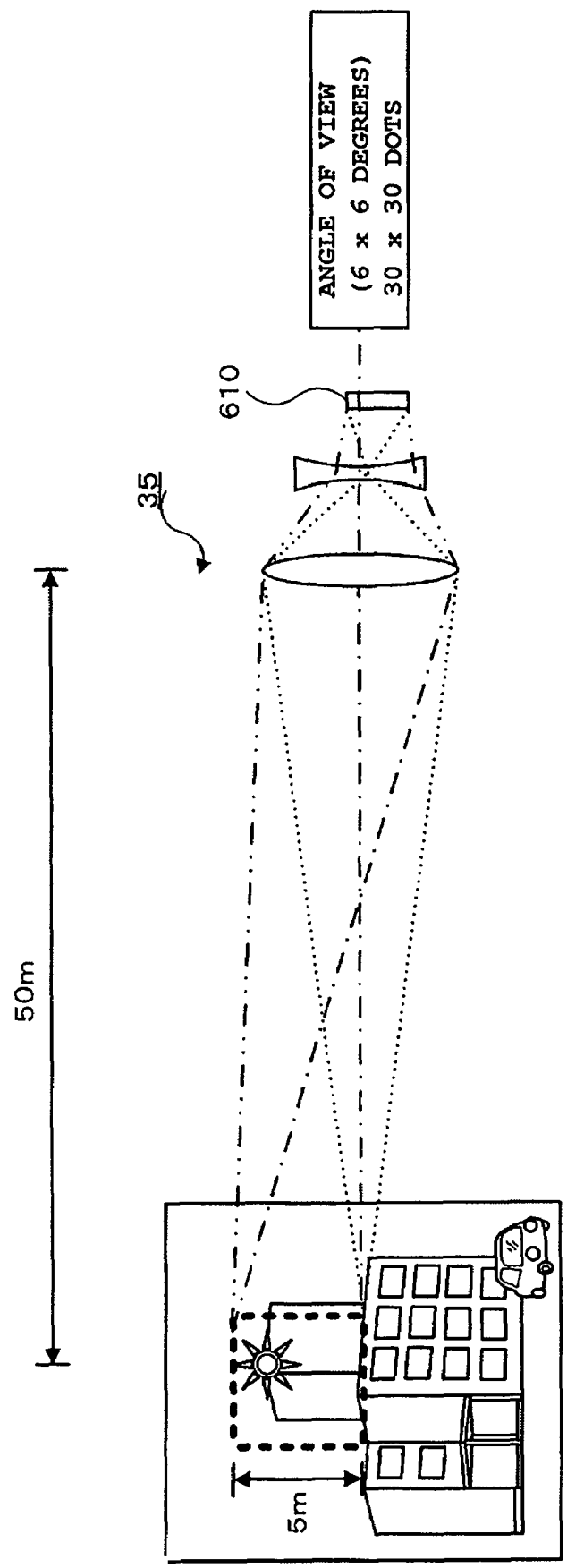
FIG. 27 is a diagram showing a detection angle of view (narrow angle of view of about 6 degrees×6 degrees) of an image sensor for communication 610 in the cell-phone unit 220 of the second embodiment.

FIG. 26 is a diagram showing a capture angle (wide angle of view of about 26 degrees×39 degrees) of the lens 34 (the image sensor 57) in the camera cell-phone 220 of the second embodiment. FIG. 27 is a diagram showing the detection angle (narrow angle of view of about 6 degrees×6 degrees) of the image sensor for communication 610 in the cell-phone unit 220 of the second embodiment.

Here, as an example of the desired value which actualizes hand blurring and rough alignment adjustment, the sensor angle of view (the angle of view of the image sensor for communication 610: 6 degrees×6 degrees) is established at a 5 m dimension of 50 m ahead. These 6 degrees provide a tangent (5 m/50 m). With six angles of view and a covering angle per 1 dot of the image sensor for communication 610 of 30×30 dots provides about 6/30=0.2 degrees on all sides.

FIGS. 28A~28D are diagrams showing the dot size appearance of the respective distances of the illumination part area (10 cm×10 cm) of the optical tag unit 18.

Figure 28A:
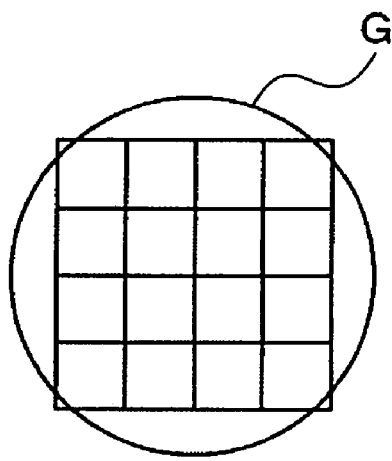
FIGS. 28A~28D are diagrams showing the dot size appearance of the respective distances of the illumination part area (10 cm×10 cm) of the optical tag unit 18.
Figure 28B:
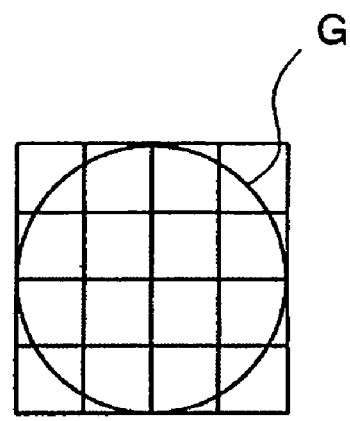
Figure 28C:
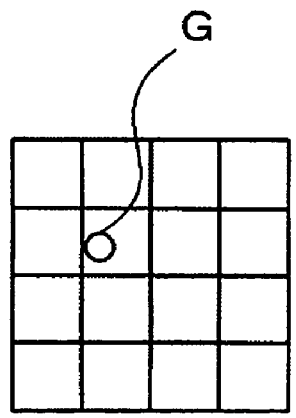
Figure 28D:
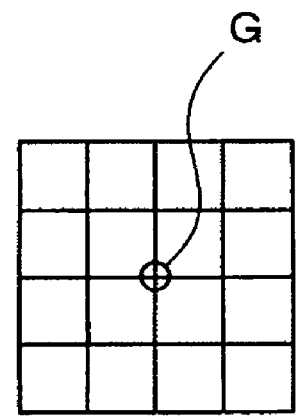

For example, as shown in FIG. 28A, in the case of the optical tag unit 18 being 5 m ahead of the camera cell-phone 220, namely, in this case there are 10 cm≈1.1 degrees, the dot size G of the optical tag unit 18 represents 1.1/0.2=5.5 dot width and optical variation yields 100%. As shown in FIG. 28B, in the case of the optical tag unit 18 being 10 m ahead of the camera cell-phone 220, namely, 10 cm≈0.6 degrees, the dot size G of the optical tag unit 18 represents 0.6/0.2=about 5 dot width and optical variation yields 100%. As shown in FIGS. 28C and 28D, in the case of the optical tag unit 18 being 50 m ahead of the camera cell-phone 220, namely, in this case there are 10 cm≈0.11 degrees, the dot size G of the optical tag unit 18 represents 0.11/0.2=about 0.5 dot width which becomes an optical variation of an area about 1 dot or less and power becomes about ¼~1/16.

In this manner, although the signal strength becomes ¼ or less at the 50 m distant location (place of the camera cell-phone 220) from the optical tag unit 18, a signal decline of this level does not cause any inconvenience. A common image sensor has a dynamic range per dot of about 30~50 dB. For that reason, if the detection level "ON" light source is in a state covering 1 dot of 50%~the saturation level of the dynamic range, even if the detection voltage declines ¼ (namely, −6 dB), this does not produce any inconvenience.

In addition, even though this level is about the shutter speed of a 0.25 millisecond, generally unconditional luminance of a light source remains virtually constant and is an extremely high luminance level related to the environment which exceeds minimum visibility requirements. Since the present invention can respond easily by the lens aperture, gain, etc. even if operating the image sensor for communication 610 at the above-mentioned 4,000 frames per second (about 0.25 of a millisecond), blinking information of a light source can be sufficiently acquired. Moreover, although there is a slight luminance upsurge by reflections of surrounding area illumination, etc., this is not a significant problem as compared with the "ON/OFF" blinks of the signal itself.

Naturally, for example, acquisition as an image like a picture is difficult with fixed shutter speed because in cases where the environment becomes dark, surrounding images become what is called "black crush" or in cases where the environment becomes bright, surrounding images become what is called "white crush." Since, the image sensor for communication 610 is used principally for "communication" and neither used as a monitor nor used for imaging, even if surrounding images other than an information light source create "black crush" or "white crush," these cause no interference.

Next, in the second embodiment, it is also possible to make the hand blurring correction mechanism (the actuator 55) unnecessary. This is due to the fact that the angle of view of the image sensor for communication 610 of the second embodiment is as large as "6 degrees×6 degrees" as compared with the angle of view "2 degrees×2 degrees" of the photodetector 61 of the first embodiment. In other words, the tolerance of hand blurring becomes 3×3=9 times. Thus, the tolerance for excessive blurring (applied from hand-shake blurring, walking, a vehicle, etc.) is strengthened. Here, although the angle of view of the image sensor for communication 610 has been stated as "6 degrees×6 degrees," this is only an example. In terms of hand blurring tolerance, the present invention has no difficulty even with an angle of view greater than this.

Figure 29A:
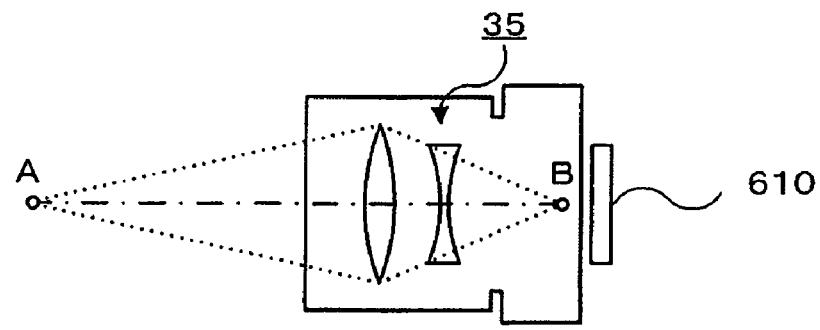
FIGS. 29A~29B are conceptual diagrams of the unnecessary hand blurring mechanism in the second embodiment.
Figure 29B:
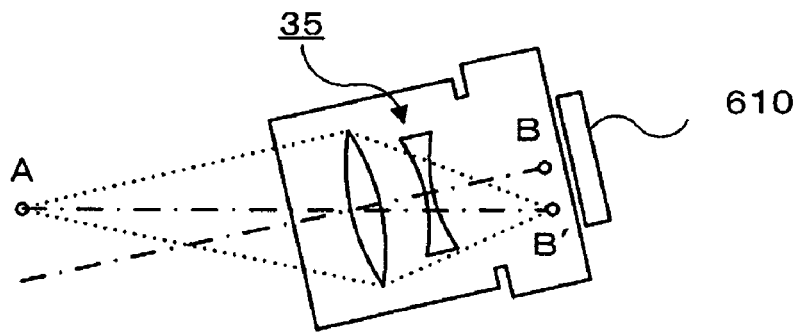

FIGS. 29A~29B are conceptual diagrams of the unnecessary hand blurring mechanism in the second embodiment. As shown in this diagram, the image sensor for communication 610 is arranged behind the condensing lens 35 and the image of the light spot A projects onto the light reception surface of the image sensor for communication 610 through the condensing lens 35. As shown in FIG. 29A, when the light spot A is positioned above the optical axis of the condensing lens 35, the image of the light spot A projects substantially to the center of position B. However, as shown in FIG. 29B, when the light spot A deviates position from the optical axis of the condensing lens 35, also the image of that light spot A projects to the shifted position B' from the optical axis of the condensing lens 35. At this stage, when the size of the light reception surface of the image sensor for communication 610 is sufficient, namely, when the image is within the projected area of the light reception surface including position B', the image of position A together with the image of position B are captured and superimposed (superimposed on top of the image of position A). Accordingly, hand blurring correction executed by image processing becomes possible. For this reason, the terminal (the camera cell-phone 220) does not have to comprise a hand blurring correction mechanism (the actuator 55).

In addition, the following can be used as an image processing method for the purpose of hand blurring correction.

Figure 30:
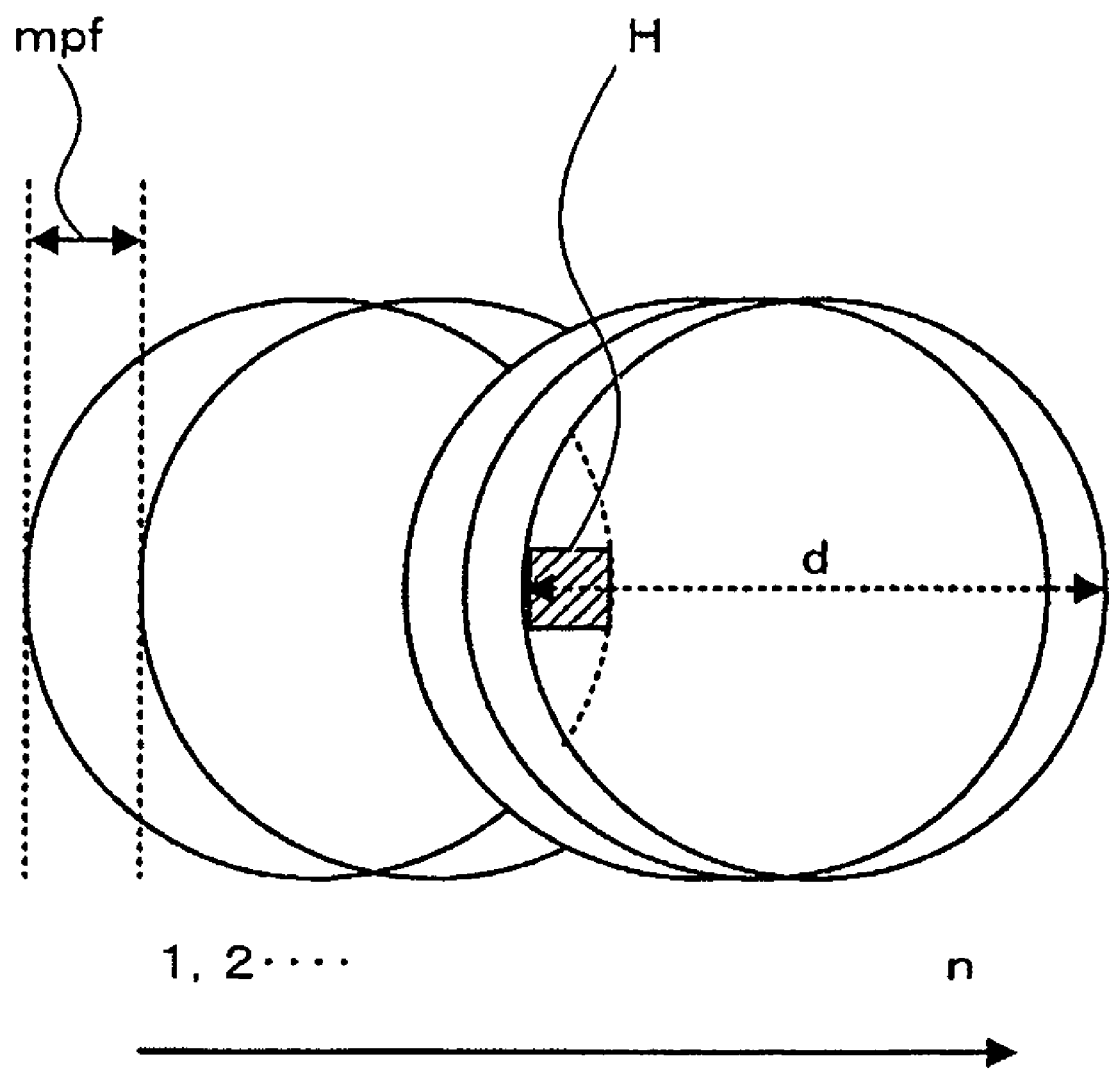
FIG. 30 is a pattern diagram showing response movement limits for capturing a pattern.

FIG. 30 is a pattern diagram showing response movement limits for capturing a pattern. As shown in FIG. 30, when each dot of the image sensor for communication 610 is concurrently processed, if a dot coordinate H overlaps through multiple frames (for example, 15 frames) in two pattern sequences, a dot showing pattern correlation will not occur. Accordingly, pattern detection will not be possible.

The following formula (1) is a general formula of the response movement limits for capturing a pattern.

$$d > mpf \times n \times x \quad (1)$$

d: Object spot diameter mpf: Movement dot number (Movement Per Frame) of 1 frame n: Spread code length (or data block length)

x: Double speed of capture in response to subject signal

When n=15(SA or SB pattern bit number=15), d=4 (10 m ahead of 10 em≈0.6 degrees 0.6/0.2=about 4 dots width) and x=4 (as a 1 kHz baseband signal is captured by 4 kHz, this represents 4) are applied to formula (1), mpf can be solved with these conditions as expressed in the following formula (2).

$$mpf < d/(n \times x) = 4/(15 \times 4) \approx 0.67 \text{ dot/1 frame time period} \quad (2)$$

This results in a 0.67 dot being about 0.134 degrees. Accordingly, in the case of angular velocity per second, this proves that a response to extremely fast angular velocity can be accomplished at 0.134×4,000=536 degrees per second. Naturally, although the maximum angular velocity is 536 degrees per second, in the case of the second embodiment, this needs to be supplied at 6 degrees in all directions (6 degrees×6 angles of view of the image sensor for communication 61).

When the present invention was actually used, these exemplified values were setup in an appropriate manner. For example, in testing the present invention's response to a smaller light source and a more distant signal light source, it was only necessary to raise the resolution of the image sensor for communication 610. Additionally, in cases where the tolerance level of hand blurring, etc. is low, the present invention can also be made to respond to a smaller dot area by extracting the angle of view of the image sensor for communication 610. Furthermore, in order to respond to extremely severe blurring, the frame rate, etc. can be raised. Incidentally, when raising the frame rate, it cannot be overemphasized that transmission speed increases.

In any case of the second embodiment, when obtained in the angle of view (6 degrees in the surrounding area) of the image sensor for communication 610, the present invention does not possess the above practical problem with blurring regardless of signal acquisition. Thus, the hand blurring mechanism (the actuator 55) of the image sensor for communication 610 can be made unnecessary.

As described above according to the second embodiment, the following effects will be acquired:

First, the distinguishing feature of two-dimensional communication can be removed. Namely, a plurality of signals can be simultaneously received by the image sensor for communication 610 and can discriminate the respective positions (discrimination by the pixel positions of the image sensor for communication 610).

Besides, coexistence of the minimum detection angle and the detection range can be promoted. Specifically, since the range of the detection alignment can be executed at 6×6 degrees in the second embodiment, the minimum light source area can also be executed at 0.2 or less degrees being 9-fold. This extends the area range 9 times as much as the equivalent range of the above-mentioned first embodiment (2 degrees×2 degrees). For this reason, if the same light source, it is possible to detect 3 times the distance of the above-stated second embodiment. Otherwise, when the same range, it is possible to detect even a smaller light source of $\frac{1}{9}^{th}$ the size of the above-stated second embodiment. Further, since a large detection angle (angle of view) can be captured, the range of the alignment area which the user implements can be set to the maintained angle of the detection limit, etc. Accordingly, a rough alignment adjustment becomes possible and operability at the time of information acquisition can be improved.

Also, simplification of the mechanism can be attained. Notably, in the case of intending to narrow the limitation of the detection angle, the hand blurring mechanism (the actuator 55) shown in the first embodiment can be made unnecessary.

In addition, a cost merit can also be considered. In particular, there may be a less number of pixels of the image sensor for communication 610 as compared with the image sensor 57 and a low resolution device (inexpensive device) can be used. Further, since a degree of precision for the optical system is not required, overall cost of each unit can be controlled.

Lastly, since a two-dimensional sensor (the image sensor for communication 610) specializing in communication is used, adjustment and design of sensor sensitivity becomes simple and straightforward. Specifically, because common scenery has a diverse illumination dynamic range from at night to during the day in fine weather, a camera which captures scenery must supply the illumination and luminance range in the real world of 10~100 dB combining shutter speed, lens aperture diaphragm, gain, etc.

However, when using the image sensor only for communication (the image sensor for communication 610) like the second embodiment, since the sensor aims only at optical communication, it is not necessary to altogether consider processing of monitor image acquisition, etc. On the other hand, since the information light source side has constant unconditional luminance, adjustment and design of sensitivity become simplified.

Figure 31:
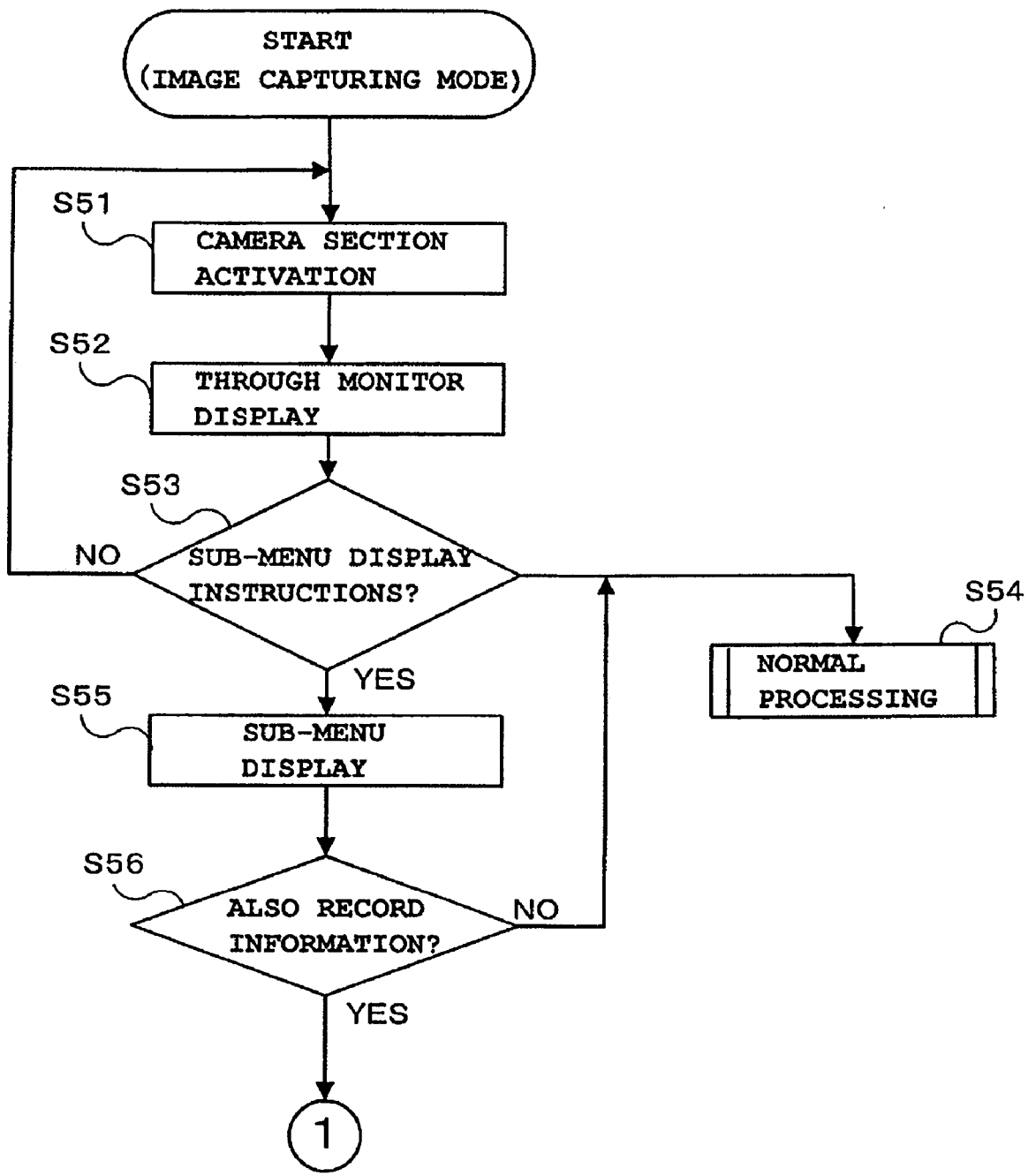
FIG. 31 is a diagram (1/3) showing a flow chart of a suitable control program (image capturing mode program) applicable to the camera cell-phone 220 of the second embodiment.
Figure 32:
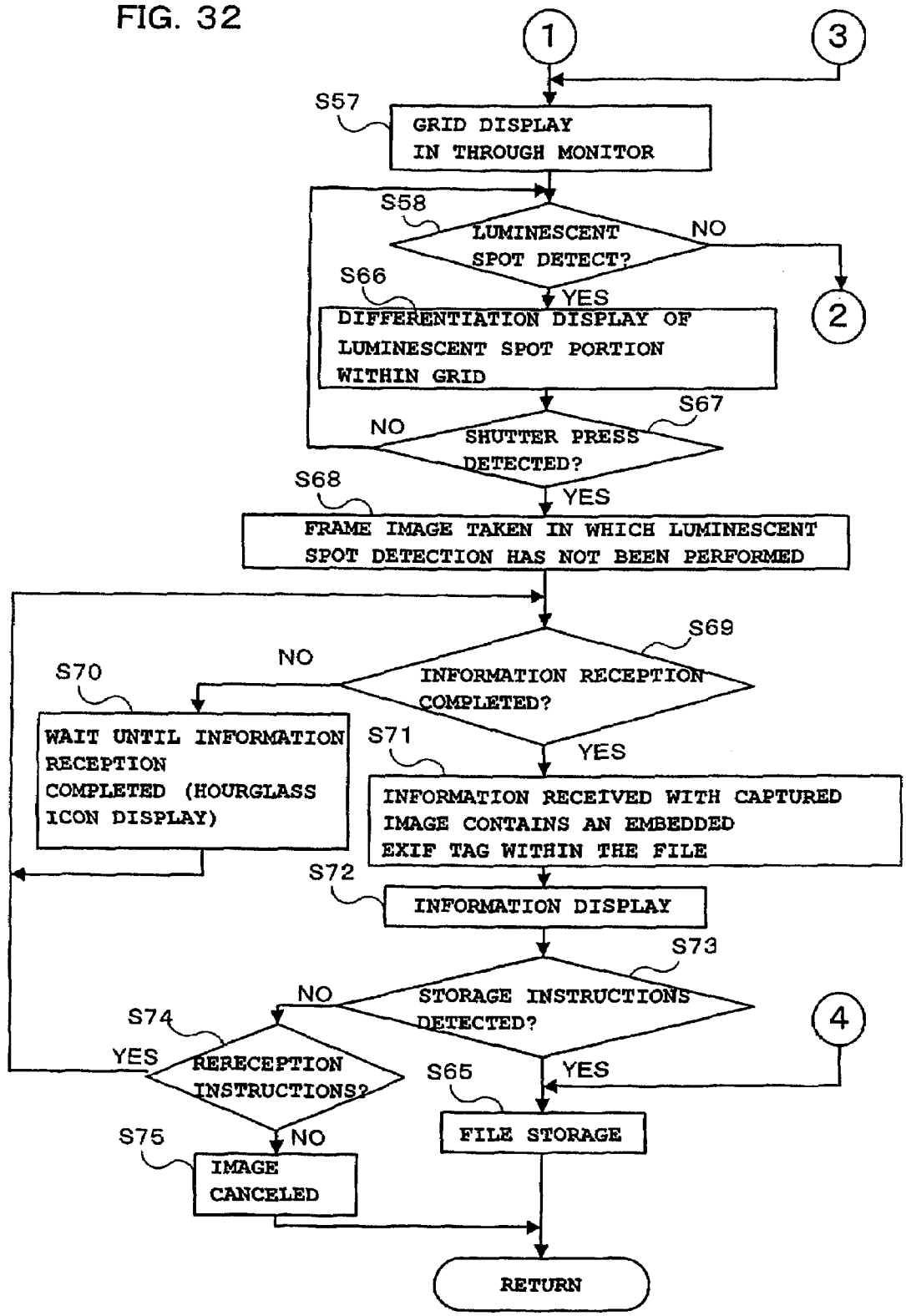
FIG. 32 is a diagram (2/3) showing a flow chart of a suitable control program (image capturing mode program) applicable to the camera cell-phone 220 of the second embodiment.
Figure 33:
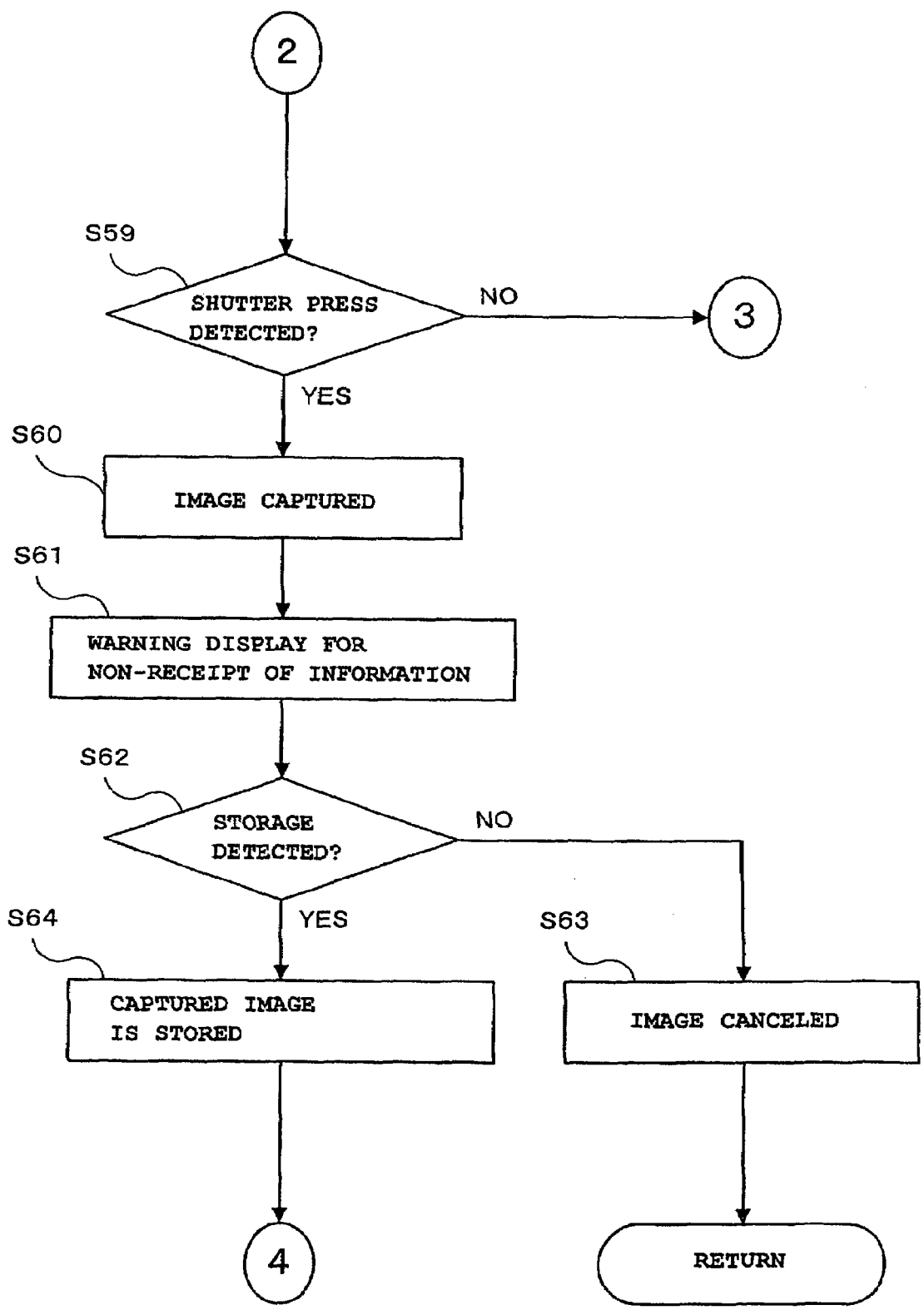
FIG. 33 is a diagram (3/3) showing a flow chart of a suitable control program (image capturing mode program) applicable to the camera cell-phone 220 of the second embodiment.

FIGS. 31~33 are diagrams showing flow charts of a suitable control program (image capturing mode program) applicable to the camera cell-phone 220 of the second embodiment. When these flow charts are initiated, the camera section, such as the image sensor 57, will be activated (Step S51). The frame image captured by the camera section will be displayed on the display section 27 as a through image for picture confirmation (Step S52).

Subsequently, processing determines whether or not display instructions of a predetermined sub-menu have been executed by the user (Step S53). The "predetermined sub-menu" is a menu for information reception from the optical tag unit 18. The applicable menu selection button is set in the manual operation section 51 beforehand.

In the case where the display instructions of a sub-menu have not been effected, normal processing used for image capturing mode will be executed (Step S54). Conversely, in the case of display instructions of a sub-menu are executed, the following processes are performed.

Specifically, the above-described predetermined sub-menu will be displayed on the display section 27 (Step S55). That sub-menu inquires whether or not the user wants to memorize that information together with the captured image (Step S56).

Then, in the case of a negative selection (information is not memorized) is executed by the user, processing reverts to the above-mentioned normal processing (Step S55). In the case of an affirmative selection (information is memorized) is executed by the user, a predetermined "grid" is displayed as a through image on the display section 27 (Step S57).

At this stage, the "grid" may be a square-shaped framed border showing the angle of view (6 degrees×6 degrees) of the image sensor for communication 610. This framed border is equivalent to the alignment frame 40 (refer to FIG. 4) of the above-mentioned embodiments. The user intending to receive information from the optical tag unit 18 regulates the orientation (image capturing direction: bearing of the exposure axis) of the camera cell-phone 22, 220 so that a notification item, such as a billboard (mass communication media) containing the information of the overall optical tag unit 18, is placed within the grid.

Next, processing determines whether or not a luminescent spot has been detected in the grid (Step S58).

In a case of not detecting a luminescent spot in the grid (determination result of Step S58 is "NO"), processing determines if a shutter button (not shown) press operation of the manual operation section 51 has been detected. If a shutter operation has not been performed, processing again reverts to Step S57. In a case where a shutter operation has been performed, the captured image of the image sensor 57 will be captured at that time (Step S60). A predetermined message for the purpose of providing a warning for non-receipt of information from the optical tag unit 18 will be displayed on the display section 27 (Step S61) and then processing detects for image storage instructions by the user (Step S62). When there are no storage instructions, the captured image can be canceled by the user (Step S63) and the flow chart ended (reverts to the main program). Conversely, when image storage instructions by the user are detected, the captured image is prepared as a file to be stored (Step S64) and afterwards saves that file in the memory section 60 (Step S65) and the flow chart ended (reverts to the main program).

In this manner, in a case of not detecting a luminescent spot in the grid, after displaying the predetermined message for the purpose of providing a warning for non-receipt of information from the optical tag unit 18, the captured image at that time may be processed as a file similar to an ordinary captured image and retained in memory storage. For this reason, the user can know that the information from the optical tag unit 18 was not able to be received by the above-mentioned warning message. Namely, the user will know intuitively that the saved image is the same as an ordinary captured image (an image without information).

Meanwhile, in a case where processing detects a luminescent spot in the grid, the luminescent spot portion in that grid is indicated by differentiation (Step S66) (determination result of Step S58 is "YES"). If the user confirms the luminescent spot portion, processing determines whether or not to reinstate that luminescent spot in the grid and, when necessary, minutely adjust the orientation (image capturing direction: bearing of the exposure axis).

Subsequently, processing determines if a shutter button (not shown) press operation of the manual operation section 51 has been detected (Step S67). If a shutter operation has not been performed, processing again reverts to Step 66. In a case where a shutter operation has been performed, the captured image of the image sensor 57 will be captured at that time (Step S68).

The image sensor 57 generates output in succession of several tens of image frames and also the luminescent spot in the grid (luminescent spot of the optical tag unit 18) is a light which blinks several times per second or several tens of times a cycle. Thus, generation output from the image sensor 57 has two types of images: an image containing a luminescent spot and an image not containing a luminescent spot. It is preferable to use an image which does not include a luminescent spot as a captured image for archival memory. This is due to the fact that when an image containing a luminescent spot is saved, the luminescent spot impedes with the view and thus the appearance of the image deteriorates in quality. For this reason, on occasions when capturing an image for storage at Step S68, the user is trying to select an image which does not include a luminescent spot.

When importation of an image has been completed, subsequently processing determines whether or not information reception from the optical tag unit 18 has been completed (Step S69). In the event that this process has not yet been completed, an icon such as an hourglass, a symbol or a message will be displayed on the display section 27 (Step S70) and Step S69 repeated.

When information reception from the optical tag unit 18 has been completed, subsequently, the image (image which does not include a luminescent spot) captured in Step S68 and the received information are organized while generating one image file (Step S71: correlation portion) and the received information will be displayed on the display section 27 (Step S72: display portion).

Next, processing determines whether or not there are any image storage instructions by the user (Step S73). When there are no storage instructions, processing determines whether or not there is any rereception of information instructions (retransmission instructions) by the user (Step S74: rereception execution portion). In the event that there is rereception of information instructions, processing presumes the information currently displayed on the display section 27 includes an error and reexecutes processing subsequent to Step S69. Here, when carrying out rereception of information, processing does not perform recapture of an image (Step S68). This is because there has been some trouble (communication failure, etc.) that only occurred during information reception from the optical tag unit 18 and does not have any effect on the image previously captured in Step S68. In this manner, the processing load can be alleviated and the processing time is shortened upon performing rereception of information.

In the event that processing cannot perform rereception (retransmission) of information, the image file generated at Step S71 will be canceled (Step S74) and the flow chart ended (reverts to the main program). Also, in the event that processing has been normally completed and storage instructions of an image are detected ("YES" at Step S73), the image file generated at Step S71, namely, an image file including the image (image which does not include a luminescent spot) captured at Step S68 and receipt information will be saved in the memory section 60 and the flow chart ended (reverts to the main program).

Here, as an example of an image file which includes the image (image which does not include a luminescent spot) captured at Step S68 and the receipt information, an EXIF file can be used which is a general-purpose format image file (EXIF stands for Exchangeable Image File Format: a specified general-purpose format image file which can used to save main image data and various attached information at the time of capturing and/or other random information). More specifically, EXIF simplifies and standardizes the exchange of data between imaging devices and software. EXIF is a is a variation of JPEG, used by almost all digital cameras to record extra interchange information to image files as they are taken. The type of information stored in a file varies by camera model, but it can include such things as date and time a photo was taken, resolution, camera settings used for the shot, amount of compression applied, color information, whether or not the flash was fired, shutter speed, name of the camera owner, and so on. Thus, in an EXIF file, the storage area of the text information is predetermined and can be randomly used. By writing the receipt information from the optical tag unit 18 in this storage area, the image data and receipt information can be rendered together in one image file.

In this manner, according to the flow chart illustration, the receipt information from the optical tag unit 18 can be rendered in one image file with the captured image and saved in memory storage. Consequently, by reading the information concerned at the time of regeneration of the image file, this makes it possible for the user to realize various services, for example, the use of a coupon such as applied in the above-mentioned embodiments.

Furthermore, since the image data including an image file is an image which does not include the luminescent spot of the optical tag unit 18, this also does not cause deterioration of the appearance at the time of image restoration.

Moreover, when performing rereception of information where processing passes over (skips) importation (Step S68) of a previously captured image, wasteful image importation processing will not be executed while the processing load is alleviated and the processing time is shortened.

In addition, the image captured at Step S68 is not restricted to a still image. The image may be a simplified dynamic image. Specifically, although an image by which generation output is carried out from the image sensor 57 is an image of several tens of frames per second, every image slice is a still picture. Since a dynamic image accompanied by motion is also visible when the frames forwarded containing individual still images are replayed (video playback) in succession, a frame image segment captured at a random time may also be imported in succession as simplified video data. However, also in a case of importing this video data, it is preferable to capture and remove from the target file the image containing a luminescent spot in order to avoid deterioration in appearance of the replayed dynamic image.

Generally, by importing simplified video data in this manner, the file size becomes voluminous when saved as a dynamic image file and will strain the capacity of the memory section 30. For example, MPEG video file compression uses three types of coding methods: Intra (I) pictures, bidirectional predictive (B) pictures, and predictive (P) pictures. In the case of MPEG file compression, "I" type pictures may be formed only from an image which does not include a luminescent spot and correspondingly "B" type pictures and "P" type pictures may be generated from the "I" type pictures.

INDUSTRIAL APPLICABILITY

As described above, since the information reception device of the present invention performs actual processing exclusively for the "optical modulation region contained in the capture angle of the imaging portion," this information reception device accelerates information decoding processing by acquiring the region essential for the above-described purpose, namely, the detection of optical modulation.

As for the industrial applicability of the information reception device, information transmission system and information reception method of the present invention, for example, the present invention is ideal for various uses, such as a landmark display for a building, etc.; an advertisement display; recreational facility information or congestion situation of an amusement park, etc.; description of an item in a store window; explanation of an exhibit in a museum or public show, etc.

While the present invention has been described with reference to the preferred embodiments, it is intended that the invention be not limited by any of the details of the description therein but includes all the embodiments which fall within the scope of the appended claims.

What is claimed is:

1. An information reception device, comprising:
an imaging portion;
a light reception portion for light reception of optional information subjected to optical modulation;
a specification portion for specifying an optical modulation region contained in a capture angle of the imaging portion;
a decoding portion for controlling the light reception portion to carry out light reception of the optical modulation region specified by the specification portion and for decoding optional information from optical modulation content contained in the optical modulation region; and
a reproduction portion for reproducing the optional information decoded by the decoding portion;
a display portion for displaying a reference marker together with content imaged by the imaging portion; and
a movement portion for arbitrarily moving the reference marker currently displayed on the display portion;
wherein the specification portion specifies the optical modulation region by moving the reference marker via the movement portion.

2. The information reception device according to claim 1, further comprising:
a light reception direction portion for directing light reception of the optical modulation region specified by the specification portion; and
a control portion for controlling the light reception portion so that an optical axis coincides with the optical modulation region when light reception has been directed by the light reception direction portion.

3. The information reception device according to claim 1, wherein the light reception portion includes:
a light receiving element; and an optical system to condense incident light to the light receiving element.

4. The information reception device according to claim 1, wherein the light reception portion includes:
a two-dimensional image sensor; and
an optical system to condense incident light to the image sensor.

5. The information reception device according to claim 1, further comprising:
a correlation portion for correlating image data imaged by the imaging portion and the optional information decoded by the decoding portion; and
a memory portion for memorizing the correlated image data and the optional information.

6. The information reception device according to claim 5, further comprising:
a first judgment portion for judging whether or not light reception of the optical modulation region has been completed by the light reception portion; and
wherein the correlation portion correlates the image data imaged by the imaging portion and the optional information based on the optical modulation region decoded by the decoding portion when it is judged that light reception of the optical modulation region has been completed by the first judgment portion.

7. The information reception device according to claim 5, further comprising:
a reporting portion for reporting a result when light reception of the optical modulation region has been completed by the first judgment portion;
a second judgment portion for judging whether or not further light reception of the optical modulation region has been directed after receiving the result from the reporting portion; and
a light reception control portion for initiating light reception of the optical modulation region by the light reception portion when it is judged that further light reception has been directed by the second judgment portion in a state of having held the image data imaged by the imaging portion.

8. The information reception device according to claim 5, further comprising:
an imaging control portion for controlling the imaging portion so that the optical modulation repeatedly switches on and switches off for specific wavelength light and for imaging a capture angle of switched off timing for the specific wavelength light.

9. The information reception device according to claim 1, further comprising:
a conversion portion for converting at least the optical modulation content of the optical modulation region light received by the light reception portion into two types of bit pattern sequences having a low degree of correlation reciprocally;
a logic signal output portion for outputting a logic signal corresponding to the two types of bit pattern sequences having the low degree of correlation reciprocally which have been converted by the conversion portion; and
wherein the decoding portion decodes the optional information based on an output by the logic signal output portion.

10. An information transmission system, which includes:
(i) an information output device, comprising:
a selection portion for determining a logic determination of a bit string representing optional information and selecting from one of two types of bit pattern sequences having a low degree of correlation reciprocally, which have been previously prepared based on the logic determination;
a modulation portion for performing optical modulation of the optional information according to a selection result by the selection portion;
an output portion for outputting the optional information which has been optically modulated by the modulation portion; and
(ii) an information reception device, comprising:
an imaging portion;
a light reception portion for light reception of the optional information subjected to the optical modulation;
a specification portion for specifying an optical modulation region contained in a capture angle of the imaging portion;
a light reception control portion for controlling the light reception portion to carry out light reception of the optical modulation region specified by the specification portion;
a conversion portion for converting at least modulation content of the optical modulation region light received by the light reception control portion into the two types of bit pattern sequences having the low degree of correlation reciprocally;
a logic signal output portion for outputting a logic signal corresponding to the two types of bit pattern sequences having the low degree of correlation reciprocally which have been converted by the conversion portion;
a decoding portion for decoding the optional information based on an output by the logic signal output portion;
a reproduction portion for reproducing the optional information decoded by the decoding portion;
a display portion for displaying a reference marker together with content imaged by the imaging portion; and
a movement portion for arbitrarily moving the reference marker currently displayed on the display portion;
wherein the specification portion specifies the optical modulation region by moving the reference marker by the movement portion.

11. An information reception method, comprising:
specifying an optical modulation region contained in a capture angle imaged by an imaging section;
controlling a light reception section to carry out light reception of the specified optical modulation region;
converting at least modulation content of the received optical modulation region light into two types of bit pattern sequences having a low degree of correlation reciprocally;
outputting a logic signal corresponding to the two types of bit pattern sequences having the low degree of correlation reciprocally which have been converted;
decoding the optional information based on the output logic signal;
reproducing the decoded optional information;
displaying a reference marker together with content imaged by the imaging portion; and
arbitrarily moving the reference marker currently displayed;
wherein the optical modulation region is specified by moving the reference marker.

* * * * *